US012394191B2

(12) United States Patent
Li et al.

(10) Patent No.: US 12,394,191 B2
(45) Date of Patent: Aug. 19, 2025

(54) NEURAL NETWORKS BASED MULTIMODAL TRANSFORMER FOR MULTI-TASK USER INTERFACE MODELING

(71) Applicant: Google LLC, Mountain View, CA (US)

(72) Inventors: Yang Li, Palo Alto, CA (US); Xin Zhou, Mountain View, CA (US); Gang Li, Mountain View, CA (US); Mostafa Dehghani, Amsterdam (NL); Alexey Alexeevich Gritsenko, Amsterdam (NL)

(73) Assignee: Google LLC, Mountain View, CA (US)

( * ) Notice: Subject to any disclaimer, the term of this patent is extended or adjusted under 35 U.S.C. 154(b) by 95 days.

(21) Appl. No.: 17/812,208

(22) Filed: Jul. 13, 2022

(65) Prior Publication Data
US 2023/0031702 A1   Feb. 2, 2023

Related U.S. Application Data

(60) Provisional application No. 63/221,677, filed on Jul. 14, 2021.

(51) Int. Cl.
*G06V 10/82*   (2022.01)
*G06F 3/16*   (2006.01)
*G06F 40/284*   (2020.01)

(52) U.S. Cl.
CPC .............. *G06V 10/82* (2022.01); *G06F 3/167* (2013.01); *G06F 40/284* (2020.01); *G06V 2201/02* (2022.01)

(58) Field of Classification Search
CPC .... G06V 10/82; G06V 2201/02; G06F 3/167; G06F 40/284
See application file for complete search history.

(56) References Cited

U.S. PATENT DOCUMENTS

2014/0304606 A1* 10/2014 Ohmura ................. G06F 3/167
                                                         715/728
2016/0034441 A1*  2/2016 Nguyen ............... G06F 40/137
                                                         715/234
(Continued)

OTHER PUBLICATIONS

Swearngin et al. (Modeling Mobile Interface Tappability Using Crowdsourcing and Deep Learning. In CHI Conference on Human Factors in Computing Systems Proceedings (CHI 2019), May 4-9, 2019, Glasgow, Scotland UK. ACM, New York, NY, USA, 11 pages. https://doi.org/10.1145/3290605.3300305). (Year: 2019).*

(Continued)

*Primary Examiner* — Tan H Tran
(74) *Attorney, Agent, or Firm* — McDonnell Boehnen Hulbert & Berghoff LLP

(57) ABSTRACT

A method includes receiving, via a computing device, a screenshot of a display provided by a graphical user interface of the computing device. The method also includes generating, by an image-structure transformer of a neural network, a representation by fusing a first embedding based on the screenshot and a second embedding based on a layout of virtual objects in the screenshot. The method additionally includes predicting, by the neural network and based on the generated representation, a modeling task output associated with the graphical user interface. The method further includes providing, by the computing device, the predicted modeling task output.

24 Claims, 12 Drawing Sheets

(56) References Cited

U.S. PATENT DOCUMENTS

| | | | |
|---|---|---|---|
| 2020/0234084 A1* | 7/2020 | Seaton | G06F 18/2148 |
| 2021/0209356 A1* | 7/2021 | Wang | G06F 18/213 |
| 2021/0335340 A1* | 10/2021 | Gowayyed | G10L 15/22 |
| 2021/0397942 A1* | 12/2021 | Collomosse | G06F 16/583 |
| 2022/0121679 A1* | 4/2022 | Singh | G06V 10/82 |
| 2022/0343626 A1* | 10/2022 | Gong | G06V 10/76 |
| 2023/0342593 A1* | 10/2023 | Sun | H04B 7/0626 |

OTHER PUBLICATIONS

Hu et al. (Transformer is All You Need: Multimodal Multitask Learning with a Unified Transformer, Facebook AI Research, published Feb. 22, 2021, pp. 1-15; "https://arxiv.org/abs/2102.10772v1") (Year: 2021).*

"End-to-End Object Detection with Transformers", facebookresearch/detr.

Li et al., "VUT: Versatile UI Transformer for Multi-Modal Multi-Task User Interface Modeling", arXiv:2112.05692v1 [cs.CV] Dec. 10, 2021.

Bai et al., "Uibert: Learning generic multimodal representations for UI understanding", Proceedings of the Thirtieth International Joint Conference on Artificial Intelligence (2021).

Brown et al., "Language models are few-shot learners", Advances in Neural Information Processing Systems, 33:1877-1901 (2020).

Carion et al., "End-to-end Object Detection with Transformers", arXiv:2005.12872v1 [cs.CV] May 26, 2020.

Deka et al., "Rico: A Mobile App Dataset for Building Data-Driven Design Applications", https://dl.acm.org/doi/10.1145/3126594.3126651, retrieved Jul. 12, 2022.

Duan et al., "CenterNet: Keypoint Triplets for Object Detection", https:/ieeexplore.ieee.org/document/9010985, retrieved Jul. 12, 2022.

Gupta et al., Towards General Purpose Vision Systems: An End-to-End-Agnostic Vision-Language Architecture:, arXiv:2104.00743 [cs.CV].

He et al., "ActionBert: Leveraging User Actions for Semantic Understanding of User Interfaces", arXiv:2012.12350v2 [cs.CV] Jan. 25, 2021.

Hu et al., "UniT: Multimodal Multitask Learning with a Unified Transformer", arXiv:2102.10772v3 [cs.CV] Aug. 18, 2021.

Hu et al., "Iterative Answer Prediction with Point-Augmented Multimodal Transformers for TextVQA", 2020 IEEE/CVF Conference on Computer Vision and Pattern Recognition (2020).

Kim et al., "VILT: Vision-and-Language Transformer Without Convolution or Region Supervision", Proceedings of the 38th International Conference on Machine Learning (2021).

Li et al., "VisualBERT: A Simple and Performant Baseline for Vision and Language", https://www.researchgate.net/ publication/335109549 (2019).

Li et al., "Screen2Ved: Semantic Embedding of GUI Screens and GUI Components", Proceedings of the 2021 CHI Conference on Human Factors in Computing Systems (2021).

Li et al., "Mapping Natural Lanugage Instructions to Mobile UI Action Sequences", Proceedings of the 58th Annual Meeting of the Association for Computational Linguistics (2020).

Li et al., "Widget Captioning: Generating Natural Language Description for Mobile User Interface Elements", Proceedings of the 2020 Conference on Empirical Methods in Natural Language Processing (EMNLP) (2020).

Li et al., "Learnable Fourier Features for Multi-Dimensional Spatial Positional Encoding", arXiv:2106.02795v3 [cs.CV] Nov. 9, 2021.

Lu et al., "12-in-1: Multi-task vision and language representation learning", Proceedings of the IEEE/CVF Conference on Computer Vision and Pattern Recognition OCVPR) 2020.

Pasupat et al., "Mapping natural language commands to web elements", Proceedings of the 2018 Conference on Empirical Methods in Natural Language Processing (2018).

Raffel et al., "Exploring the Limits of Transfer Learning with a Unified Text-to-Text Transformer", Journal of Machine Learning Research 21:1-67 (2020).

Swearngin et al., "Modeling Mobile Interface Tappability Using Crowdsourcing and Deep Learning", https://dl.acm.org/doi/10.1145/3290605.3300305, retrieved Jul. 12, 2022.

Tan et al., "LXMERT: Learning Cross-Modality Encoder Representations from Transformers", Proceedings of the 2019 Conference on Empirical Methods in Natural Language Processing and the 9th International Joint Conference on Natural Language Processing (EMNLP-IJCNLP) (2019).

Vinyals et al., "Pointer Networks", Advances in Neural Information Processing Systems, (2015).

Wang et al., "Screen2Words: Automatic Mobile UI Summarization with Multimodal Learning", arXiv:2108:03353v1 [cs.HC] Aug. 7, 2021.

Xu et al., "Show, Attend and Tell: Neural Image Caption Generation with Visual Attention", Proceedings of the 32nd International Conference on Machine Learning (2015).

Zhang et al., "Screen Recognition: Creating Accessibility Metadata for Mobile Applications from Pixels", Proceedings of the 2021 CHI Conference on Human Factors in Computing Systems (2021).

Zhou et al., "Unified Vision-Language Pre-Training for Image Captioning and VQA" Technical Tracks, 34:7, https://ojs.aaai.org//index.php/AAAI/article/view/7005, retrieved Jul. 12, 2022.

* cited by examiner

← 1100

1110 Receiving, via a computing device, a screenshot of a display provided by a graphical user interface of the computing device

1120 Generating, by an image-structure transformer of a neural network, a representation by fusing a first embedding based on the screenshot and a second embedding based on a layout of virtual objects in the screenshot

1130 Predicting, by the neural network and based on the generated representation, a modeling task output associated with the graphical user interface

1140 Providing, by the computing device, the predicted modeling task output

FIG. 11

NEURAL NETWORKS BASED MULTIMODAL TRANSFORMER FOR MULTI-TASK USER INTERFACE MODELING

CROSS-REFERENCE TO RELATED APPLICATIONS/INCORPORATION BY REFERENCE

This application claims priority to U.S. Provisional Patent Application No. 63/221,677, filed on Jul. 14, 2021, which is hereby incorporated by reference in its entirety.

BACKGROUND

Neural networks can be trained to predict aspects of a modeling task related to a graphical user interface, such as, for example, content, functionality, layout, and so forth. Modern graphical user interfaces enable a rich problem space for modeling where the input is inherently multimodal, and consists of several distinct types of data. Based on graphical user interfaces, there is a wide spectrum of modeling tasks that can directly enhance end user experiences and advance the development of intelligent user interfaces.

SUMMARY

In one aspect, a computer-implemented method is provided. The method includes receiving, via a computing device, a screenshot of a display provided by a graphical user interface of the computing device. The method also includes generating, by an image-structure transformer of a neural network, a representation by fusing a first embedding based on the screenshot and a second embedding based on a layout of virtual objects in the screenshot. The method additionally includes predicting, by the neural network and based on the generated representation, a modeling task output associated with the graphical user interface. The method further includes providing, by the computing device, the predicted modeling task output.

In another aspect, a computing device is provided. The computing device includes one or more processors and data storage. The data storage has stored thereon computer-executable instructions that, when executed by one or more processors, cause the computing device to carry out functions. The functions include: receiving, via a computing device, a screenshot of a display provided by a graphical user interface of the computing device; generating, by an image-structure transformer of a neural network, a representation by fusing a first embedding based on the screenshot and a second embedding based on a layout of virtual objects in the screenshot; predicting, by the neural network and based on the generated representation, a modeling task output associated with the graphical user interface; and providing, by the computing device, the predicted modeling task output.

In another aspect, a computer program is provided. The computer program includes instructions that, when executed by a computer, cause the computer to carry out functions. The functions include: receiving, via a computing device, a screenshot of a display provided by a graphical user interface of the computing device; generating, by an image-structure transformer of a neural network, a representation by fusing a first embedding based on the screenshot and a second embedding based on a layout of virtual objects in the screenshot; predicting, by the neural network and based on the generated representation, a modeling task output associated with the graphical user interface; and providing, by the computing device, the predicted modeling task output.

In another aspect, an article of manufacture is provided. The article of manufacture includes one or more computer readable media having computer-readable instructions stored thereon that, when executed by one or more processors of a computing device, cause the computing device to carry out functions. The functions include: receiving, via a computing device, a screenshot of a display provided by a graphical user interface of the computing device; generating, by an image-structure transformer of a neural network, a representation by fusing a first embedding based on the screenshot and a second embedding based on a layout of virtual objects in the screenshot; predicting, by the neural network and based on the generated representation, a modeling task output associated with the graphical user interface; and providing, by the computing device, the predicted modeling task output.

In another aspect, a computing device is provided. The computing device includes means for receiving, via a computing device, a screenshot of a display provided by a graphical user interface of the computing device; means for generating, by an image-structure transformer of a neural network, a representation by fusing a first embedding based on the screenshot and a second embedding based on a layout of virtual objects in the screenshot; means for predicting, by the neural network and based on the generated representation, a modeling task output associated with the graphical user interface; and means for providing, by the computing device, the predicted modeling task output.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 11 is a flowchart of a method, in accordance with example embodiments.

DETAILED DESCRIPTION

Figure 1:
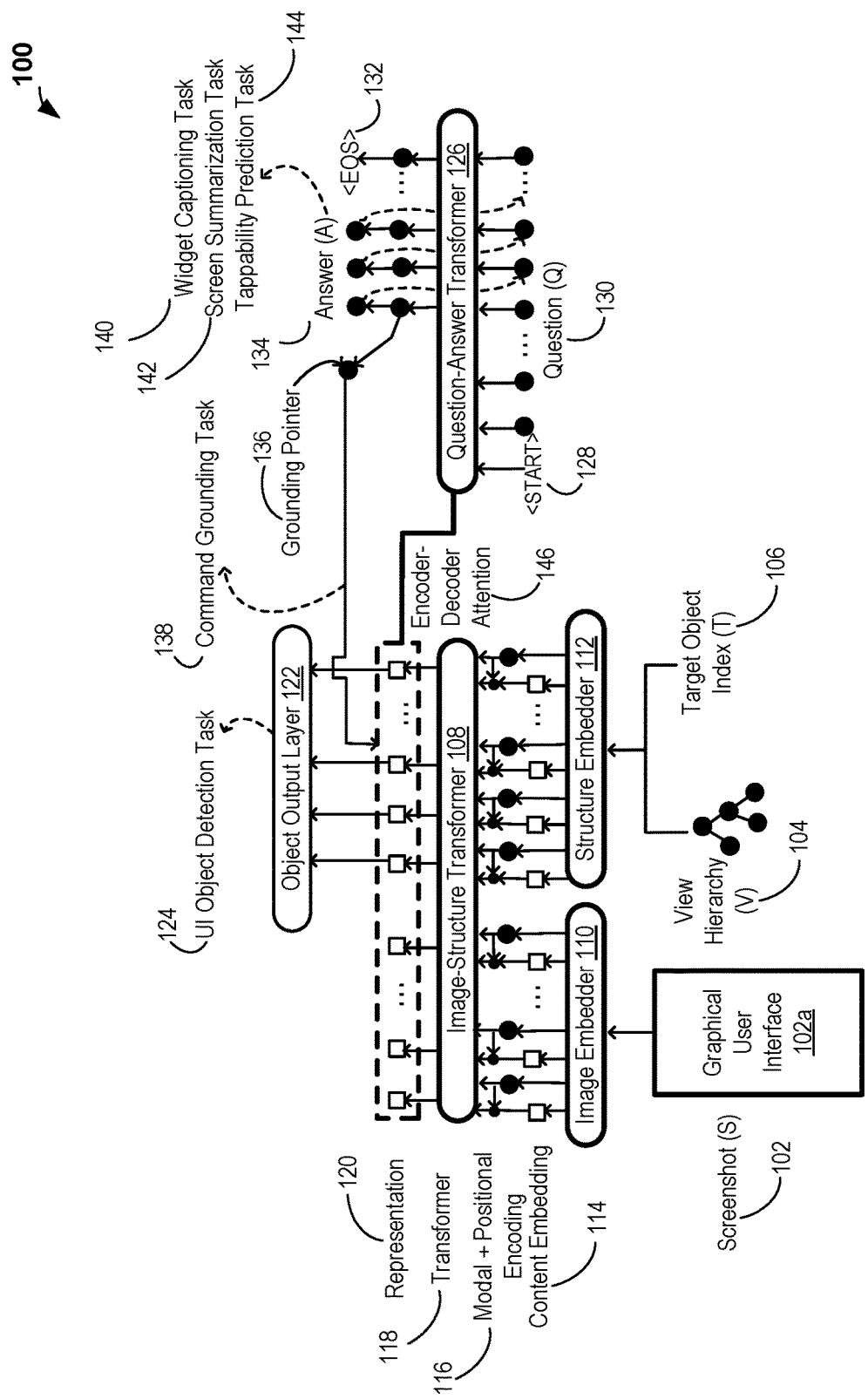
FIG. 1 is a diagram illustrating an example neural network, in accordance with example embodiments.

This application relates to a transformer architecture based neural network that can take a multimodal input and can simultaneously accomplish a plurality of modeling tasks for a graphical user interface. The tasks may include, for example, UI object detection, natural language command, grounding, widget captioning, screen summarization, and UI tappability prediction. The model may be configured to handle three type of data: images, structures (e.g., view hierarchies), and natural language.

The flexible architecture of a transformer has made it a "Swiss army knife" for solving a wide range of problems. In addition to its successes in addressing individual domains that deal with homogeneous input or output, such as natural language, and vision, a transformer architecture has recently shown promising results for addressing problems that involve multimodal input, multi-task output, or both.

Described herein is a task of modeling of graphical user interfaces, an important medium that underpins almost every aspect of daily human activity. Modern graphical user interfaces enable a rich problem space for modeling where the input is inherently multimodal, consisting of several distinct types of data. A user interface screen exists in both a visual form, i.e., a screenshot, and a structural representation, i.e., a tree-like view hierarchy. Based on graphical user interfaces, there is a wide spectrum of modeling tasks that will directly enhance end user experiences and advance the development of intelligent user interfaces. For example, existing methods developed models and datasets for grounding a language command into an executable UI action, generating language description for accessibility on mobile devices, and understanding the usability of user interfaces, or identifying the objects on the screen. Previous work has also started learning effective representation of user interface screens, which can potentially benefit downstream tasks.

A versatile user interface transformer (VUT) is described, that can handle three types of data: images, structures (view hierarchies) and language, and can perform a plurality of distinct tasks, such as UI object detection, natural language command, grounding, widget captioning, screen summarization, and UI tappability prediction.

VUT can perform the distinct tasks simultaneously. Generally, use of different models for different tasks can result in significant computing resources, including memory resources, processing resources, and/or power resources. This can be especially challenging when the tasks have to be performed on a mobile device, such as a mobile phone. Therefore, performing all the distinct tasks using one model can substantially reduce an amount of computing resources needed.

VUT is a multimodal model for graphical user interface multi-task modeling with one model to accomplish a wide range of tasks for enhancing mobile user experiences.

VUT can be based on a two-tower transformer architecture, one for image-structure and the other for language, where each transformer serves the purpose for both encoding and decoding its own modality, with cross-tower attention.

The image-structure transformer can serve as both an encoder and a decoder. VUT's image-structure transformer can perform early fusion across modalities. But instead of operating across language and image regions, VUT's image-structure transformer operates on an entire screenshot image and view hierarchy structures. This enables enhanced efficiency and accuracy in the performance of the tasks. VUT's image-structure transformer is not only for representation learning but also for object detection when view hierarchy information is not present in the input, such as for the object detection task.

VUT's image-structure transformer is a single tower architecture where both the image and object queries are input to the same transformer, i.e., early fusion, instead of an encoder-decoder architecture used in traditional models.

VUT's question-answer transformer is designed based on an auto-regressive architecture where a question or a command is input to the model as a prefix, and the responses are decoded token by token.

For the language (command) grounding task, instead of generating a language response as in existing models, the last hidden state of the model is used to retrieve a UI object on the screen to fulfill the command.

Using multiple and distinct heads based on the same neural network layers increases efficiency and accuracy, and also enables efficient individual, and/or joint training of one or more tasks.

FIG. 1 is a diagram illustrating an example neural network 100, in accordance with example embodiments. A graphical user interface contains a collection of UI elements for fulfilling a coherent set of tasks. There may be various types of data involved to formulate a UI task: <S, V, T, Q, A>. S is the screenshot image 102 that describes the visual appearance of the UI screen 102a. V is the view hierarchy 104 tree that represents the underlying structure of the UI screen 102. T is the target object 106 (UI element) in the view hierarchy 104 to be operated on or inquired. Q is the natural language description of the task, which can be an open-ended question 130 such as "What is the caption of the element?", a yes-or-no question such as "Does the object look clickable?", or a command such as "Click on the Next button," and so forth. Answer A 134 is the natural language answer to the question Q 130, when the form of the response for the task is in natural language.

In some embodiments, the method involves receiving, via a computing device, a screenshot 102 of a display provided by a graphical user interface of the computing device.

The method also includes generating, by an image-structure transformer 108 of neural network 100, a representation 120 by fusing a first embedding based on the screenshot and a second embedding based on a layout of virtual objects in screenshot 102. The image-structure model 108 encodes the entire screenshot 102 of a UI and its view hierarchy tree 104, with early fusion of the two modalities.

Generally, the image-structure transformer 108 is a two-modal model, which takes an image such as screenshot 102, and the corresponding view hierarchy 104, and outputs a hidden representation 120 of the image 102 and each node in the view hierarchy 104. For the image modality, a content embedding 114 $C_S$ for screenshot 102 can be computed by image embedder 110, and a content embedding 114 for view hierarchy 104 can be computed by structure embedder 112. Such embeddings may be combined with modal and positional encoding 116 Ps and input into image-structure transformer 108. Transformer 118 generally refers to a transformer layer of neural network 100, where the transformer layer comprises image-structure transformer 108 and question-answer transformer 126.

Screenshots may be randomly resized for image augmentation, and may therefore have different sizes. In some embodiments, a binary non-padding mask $S_{mask}$ of screenshot S 102 may be used. Also, for example, tensor reshaping and/or broadcasting may be applied. Content embedding 114 $C_S$ may be determined as:

$$C_S=\text{Dense}(\text{ResNet}(S)); P_S=PE(S_{mask}) \quad \text{(Eqn. 1)}$$

where $C_S \in \mathbb{R}^{M \times D}$ and $P_S \in \mathbb{R}^{M \times D}$, where M is a number of super pixels after ResNet and D denotes a dimension of the representation.

In some embodiments, the method involves predicting, by neural network 100, the layout of virtual objects in screenshot 102. The image-structure model 108 predicts UI objects when the view hierarchy 104 is absent in the input. For the view hierarchy modality, when view hierarchy 104 is absent, as in the object detection task 124, values for content embedding 114 $C_V$ for the view hierarchy modality are set to zero. In some embodiments, the positional encoding 116 $P_V$ for the view hierarchy modality can be a learned embedding vector for each query position. When the view hierarchy 104 is present in the input, each object in the view hierarchy tree, view hierarchy 104, is embedded in the context of the entire structure.

A user interface (UI) object may include a set of attributes, including a type, whether it is clickable, positions of bounding boxes, order in the document (DOM) positions, text content, and whether the object is the target. The attributes may be embedded separately to the same dimension and then combined via addition to form an embedding of each element.

The attributes may be embedded separately to the same dimension and then combined via addition to form the embedding of each element, $E_0$. Note that for the command grounding task 138, the information of whether the object is the target may be absent in the input, as T is to be predicted by the model. The approach for computing $C_v$ and $P_v$ for the nodes in V can be similar to existing techniques. The embedding of the view hierarchy modality, whether V is present in the input, can be two tensors: $C_v \in \mathbb{R}^{N \times D}$ and $P_v \in \mathbb{R}^{N \times D}$.

Then, the method involves determining, by neural network 100 and for each of the screenshot 102 and the view hierarchy 104, a content embedding 114 and a positional embedding 116. The generating of the representation 120 by fusing can involve generating the representation 120 based on content embeddings 114 and positional embeddings 116. Because the embeddings from the two modalities (image modality and view hierarchy modality) will jointly participate in the self-attention of the transformer encoder, it may be advantageous to make their positional encoding global, instead of local, to each modality. To this end, a learnable modal embedding may be added to each of these modality-specific positional encodings. The embeddings from the two modalities may be concatenated along the first dimension to form the input to image-structure transformer 108 to output representation 120.

For example, $P_s$ and $P_v$ may be positional encodings within each modality. Generally, the embeddings from the two modalities may jointly participate in the self-attention of the transformer encoder. In some embodiments, the positional embedding 116 for the screenshot 102 and the positional embedding 116 for the view hierarchy 104 may be global embeddings corresponding to the entire screenshot 102. For example, the positional encoding may be global instead of local to each modality. To this end, a learnable modal embedding may be added to each of these modality-specific positional encodings as follows:

$$P_s'=P_s+E_s; P_v'=P_v+E_v \quad \text{(Eqn. 2)}$$

where $E_s \in \mathbb{R}^{1 \times D}$ and $E_v \in \mathbb{R}^{1 \times D}$ are the learnable embeddings for the image and view hierarchy modality respectively. The embeddings of the two modalities may then be concatenated along the first dimension to form the input the Transformer encoder:

$$C=\text{Concat}_{1st\_dim}[C_s, C_v]; P=\text{Concat}_{1st\_dim}[P_s', P_v'] \quad \text{(Eqn. 3)}$$

where $C \in \mathbb{R}^{(M+N) \times D}$ and $P \in \mathbb{R}^{(M+N) \times D}$ are the final content embedding and positional encoding respectively, which are fed to a multi-layer Transformer encoder:

$$H=\text{Transformer}_{Encoder}(C,P) \quad \text{(Eqn. 4)}$$

where the hidden representation $H \in \mathbb{R}^{(M+N) \times D}$. In some embodiments, H may be split for the hidden representation for each modality:

$$H_s=H[:M]; H_v=H[M:] \quad \text{(Eqn. 5)}$$

while result in the hidden representations for each modality: $H_s \in \mathbb{R}^{M \times D}$ and $H_v \in \mathbb{R}^{N \times D}$.

The image-structure model 108 performs the object detection task 124. For example, object output layer 122 can be configured to output UI object detection task 124 based on representation 120. In some embodiments, the method involves receiving, via the computing device, a view hierarchy 104 indicative of the layout of virtual objects in screenshot 102.

The method additionally includes predicting, by neural network 100 and based on the generated representation 120, a modeling task output associated with the graphical user interface. The term "modeling task output" as used herein generally refers to any task associated with a graphical user interface. For example, the graphical user interface may include virtual objects, lists, images, videos, icons, user-selectable icons, user-adjustable controls (e.g., slider bars to adjust image features, sound characteristics, etc.), application interfaces, application icons, and input fields for text, images, voice, etc. The graphical user interface may also include various relationships between such objects, tasks that may be performed, hierarchical structure, and display characteristics including color, hue, resolution, and so forth. Accordingly, a modeling task output may be an output of any task that identifies various elements, attributes, functionalities, design, layout, and so forth for a graphical user interface. Such tasks may include an output of a natural language command grounding task, a widget captioning task, a screen summarizing task, an object detection task, a tappability prediction task, and so forth.

In some embodiments, the modeling of the graphical user interface comprises multi-task modeling, and wherein neural network 100 comprises dual transformers, wherein the image-structure transformer 108 predicts the modeling task output for an image-structure task, a question-answer transformer 126 predicts the modeling task output for a natural language task. The question-answer model 126 encodes questions and predicts answers using the encodings from the image-structure model 108. The image-structure transformer 108 and the question-answer transformer 126 are configured with cross-tower attention (e.g., encoder-decoder attention 146).

In some embodiments, the question-answer transformer 126 can be a language model that encodes the question Q 130 and decodes the answer A 134. The process may begin at "START" 128 and end at "EOS" 132. An input for the model may be $X=x_{1:t}$, where t denotes a length of the sequence. The input may be a token sequence of question Q 130 for a command grounding task 138, or a concatenation of Q 130 with decoded answer A' when answer A 134 is a language answer to be generated. In some embodiments, during training with teaching forcing A=A'. During autoregressive inference, A' is the predicted token sequence up to a step.

$$g_{1:t} = \text{Transformer}_{Decoder}(E(x_{1:t}), PE(1:t); H_s, H_v) \quad \text{(Eqn. 6)}$$

Where $x_i$ is the i-th token in the sequence (1≤i≤t), and E(.) and PE(.) compute the content embedding and the positional encoding of each token in the sequence. $H_s$ and $H_v$ can be accessed via the encoder-decoder attention 146 in the Transformer decoder. The sequence of hidden states, $g_{1:t}$, $g_i \in \mathbb{R}^D$, may be used for predicting the next token for generating an answer or for retrieving a target UI object in the view hierarchy for command grounding task 138.

In some embodiments, the modeling task output is for one or more of: an object detection task 124, a natural language command grounding task 138, a widget captioning task 140, a screen summarizing task 142, or a tappability prediction task 144. The question-answer model 126 directly achieves a task when the task output is language, e.g., widget captioning task 140, screen summarization task 142, and tappability prediction task 144. For command grounding task 138, representation 118 of image-structure transformer 108 may be used instead to locate UI elements to be acted upon.

In some embodiments, neural network 100 comprises an object detection head, a text head, and a pointer head. These heads are based on the hidden representation 120. For example, an object detection head, such as object output layer 122, may be used for the UI object detection task 124, where $H_v$ may be used as an input layer. Then, $$Y_{type} = H_v W_{type}; Y_{bbx} = \emptyset(H_v, \theta_{bbx}) W_{bbx} \quad \text{(Eqn. 7)}$$

where $W_{type} \in \mathbb{R}^{N \times K}$ is a linear projection to output the object type logits, where K denotes 1 more than the number of UI object classes (e.g., 21+1=22). In some embodiments, an additional PADDING type may be included on top of the original UI object classes. The function $\emptyset(.)$ is a multi-layer perceptron parametrized by $\theta_{bbx}$, and $W_{bbx} \in \mathbb{R}^{N \times 4}$ is a linear projection for generating the coordinates. The logits $Y_{type} \in \mathbb{R}^{N \times K}$ are both for generating object predictions and computing optimal compound loss using Hungarian Matching during training.

A text head may be used for the tasks that have a text response component, such as answer A 134, a softmax layer may be applied on top of the decoder hidden state, $g_{1:t}$, as determined in Eqn. 6, to generate each answer token:

$$a_i = \text{argmax}(\text{Softmax}(g_{|Q|+i-1} W_{txt})) \quad \text{(Eqn. 8)}$$

Where $a_i$ is the i-th token in the answer sequence A, and |Q| is the length of the question. Also, $W_{txt} \in \mathbb{R}^{D \times |vocab|}$ denotes the learnable weights and |vocab| is the vocabulary size. For each of the tasks that have a text response component, the model can be optimized for the cross-entropy loss over the predicted and ground-truth answer token sequences.

A pointer head or grounding pointer 136, may be used for the command grounding task 138, the last hidden state from the Transformer decoder may be used as a "pointer" to match against all the objects in the view hierarchy 104 based on their hidden representations 120, using dot product similarity as below:

$$\hat{t} = \underset{1 \leq j \leq N}{\text{argmax}} \text{Softmax}(g_{|Q|} W_{ptr} \cdot h_j) \quad \text{(Eqn. 9)}$$

Where $h_j$ is the j-th row in $H_v$ that is the hidden representation of the j-th object in view hierarchy 104. The term $W_{ptr} \in \mathbb{R}^{D \times D}$ denotes the learnable projection, and $g_{|Q|}$ denotes the last hidden state from the decoder (as determined using Eqn. 6), which is able to access the entire question (command) sequence, Q 130, via the decoder self-attention, and the last hidden state can be used as the "pointer" instead of embedding the pooling of a bag of words in a span. The model may be optimized by minimizing the cross-entropy loss between the predicted and the ground-truth object index.

In some embodiments, the modeling task output is for an object detection task 124, and the method involves detecting, by neural network 100, one or more types of container objects indicative of a layout hierarchy of the screenshot 102. Given the screenshot image, S 102, the object detection task 124 is to detect each UI element on the screen. In some embodiments, the modeling task output is for an object detection task 124, and the method involves detecting, by neural network 100, one or more of a text field, a toggle button, or an image view. This task is challenging in that it needs to detect different types of container objects which determine the layout hierarchy of the screen. In some embodiments, the layout hierarchy comprises one of a linear layout, a frame layout, or a list. Detection of such objects is a significant step toward providing accessibility features or reconstructing or adapting UIs when view hierarchy 104 is not available. As a screen understanding task, the task can be beneficial to improving other UI modeling tasks. The task is formulated as:

$$V = F(S) \quad \text{(Eqn. 10)}$$

In some embodiments, the object detection task 124 may be achieved based on the single-tower image-structure Transformer and does not rely on the question-answer model.

In some embodiments, the modeling task output is for a widget captioning task 140, and the method involves predicting, by neural network 100 and for screenshot 102, a natural language description of a functionality of a predicted virtual object in the graphical user interface. Generating a natural language description for user interface elements can be a significant task for accessibility and language-based interaction in general. In some embodiments, given the UI view hierarchy 104, the screenshot image, S 102, and the target element, T 106, the model predicts a natural language phrase A 134 that describes the functionality of the object. The relationship may be described as:

$$A = F(S, V, T, Q) \quad \text{(Eqn. 11)}$$

The model uses the information of S 102, and view hierarchy 104, via the image-structure model 108. Examples of question Q 130 in widget captioning task 140 can include, "What is the caption of the element?" or "What best describes the object?". Examples of answer A 134 can include "Forward", or "Shopping Cart". The widget captioning task 140 extends techniques involving classic image captioning tasks to the UI domain.

The method further includes providing, by the computing device, the predicted modeling task output.

In some embodiments, the modeling task output is for a widget captioning task 140, and the method involves predicting, by neural network 100 and for screenshot 102, a natural language description of a functionality of a predicted virtual object in the graphical user interface.

In some embodiments, the modeling task output is for a screen summarization task 142, and the method involves predicting, by neural network 100, a summarization of screenshot 102 of graphical user interface screen summarization task 142 is a task that generates a summary that describes the entire screen, determined by Equation 3 below, instead of focusing on an individual element as the widget captioning task 140.

$$A = F(S, V, Q) \qquad \text{(Eqn. 12)}$$

Some examples of question Q 130 for the screen summarization task 142 are "What is the description of the screen?" or "What best summarizes the UI?" The task is broadly related to multimodal summarization tasks in existing methods, but is specific to the user interface domain.

A useful feature of modern smartphone interfaces is to interpret the natural language command of users as executable actions, e.g., voice control. In the language command grounding task 138, given the UI, S and V, and the language command, Q, the model needs to predict which object on the screen can fulfill the language command. This may be determined as:

$$T = F(S, V, Q) \qquad \text{(Eqn. 13)}$$

Accordingly, the method also involves associating the target virtual object with a natural language command. The method further involves providing the natural language command via the graphical user interface. Note that instead of generating a natural language response like widget captioning task 140 and screen summarization task 142, this task locates the target object, T 106, on the screen. The possibility of Q 130 can be unbounded, which can be any phrase input by the user for purposes of manipulating the UI. Some example questions Q 130 can be, "Go to the next screen", or "Tap on the checkout button". A command can also refer to an object indirectly such as "Click the icon to the right of the search box."

In some embodiments, the providing of the natural language command comprises displaying the natural language command at or near the target virtual object. In some embodiments, the providing of the natural language command comprises providing the natural language command as a voice command in response to user interaction with the target virtual object. An important feature of modern smartphone interfaces is to interpret the natural language command of users as executable actions, e.g., Voice Control.

In some embodiments, the modeling task output is for a tappability prediction task 144, and the method involves identifying, for the graphical user interface, a mismatch between a developer-designed tappability feature and a user-perceived tappability feature. Whether a user perceives a UI object as clickable can be a significant usability issue. The mismatch between tappability perceived by the user and intended by the designer or developer can adversely affect mobile user experiences. In tappability prediction task 144, given the UI, S 102 and view hierarchy 104, the target under inquiry, T 106, and the query question, Q 130, the model provides a yes-or-no answer, A 134. This may be determined as:

$$A = F(S, V, T, Q) \qquad \text{(Eqn. 14)}$$

The method also involves providing, to the developer of the graphical user interface, a recommendation to offset the identified mismatch. Generally, the tasks share the image-structure transformer 108. Except for the UI object detection task 124, the other tasks share the question-answer transformer 126 as well. As a result, natural language input, Q, is a task indicator for such tasks. Q also carries the actual task specifics for the grounding task to find the object on the UI.

For the Tappability Prediction task, synthetic Yes-or-No questions may be generated based on the following regular expression pattern. The model is trained to decode yes or no as the answer to the question: "Is the [object|element|widget|control] [clickable|tappable]?" In some embodiments, the question examples that are generated based on the regular expression are, for example, "Is the object tappable?," "Is the widget clickable?," "Is the element tappable?," and so forth.

For the widget captioning task 140 and screen summarization task 142, the model will need to generate an open-ended answer. In some embodiments, the following regular expressions may be used to generate questions for these tasks. VUT may be trained to decode a screen summary or a widget caption following the question: "What is the [summary|description] of the [screen|UI]?," or "is the [caption|description] of the [object|element|widget|control]?" Some questions generated based on the regular expressions can be: "What is the summary of the screen?," "What is the description of the UI?," "What is the caption of the widget?," "What is the description of the object?," and so forth.

For the Language Command Grounding task 138, commands that refer to a specific object in the screen may be fed to the model by which the model is trained to locate the referred object. Example commands may be generated by human annotators for a target UI object shown on a screen. For example, a human annotator may be asked to come up with different commands referring to each highlighted target object. Commands such as "click on the notification bar above the status option," "press on the back arrow button," "select the icon above the clock option," "swipe down the notification bar," may be generated by human annotators.

The method also involves training neural network 100 to receive an input screenshot displayed by a particular graphical user interface, and predict a modeling task output associated with a modeling of the particular graphical user interface. For the UI Object Detection task, RICO, a public corpus of mobile user interfaces that contains 64,462 unique Android screens from 9,362 different apps can be used for training. Each screen includes an RGB screenshot and a corresponding view hierarchy. A view hierarchy is a tree structure of nodes with 21 unique types, which can be consolidated from the Android View class attributes in the original dataset. A node in the tree corresponds to a UI element on the screen or a container element that manages the layout of its children. In some embodiments, a view hierarchy can have a maximum of 128 nodes in the dataset. For example, the data may be split into the train (54,611), validation (2,518), and test sets (2,627). Additional and/or alternative datasets are possible, with various distributions for training, validation, and testing sets.

For the Widget Captioning task, a public dataset can be used. The released dataset includes more than 200 k human annotations for over 46 k unique UI objects from 17 k RICO screens. The annotated UI elements can be split for training (39,951), validation (3,436) and test (3,531). In some embodiments, the dataset may be split app-wise so that screens of the same app may only occur in one of the splits.

The Screen Summarization dataset for 22,301 unique Android screens was collected. Based on a UI screen shown, a human worker was asked to generate 3-5 summaries for the screen. The maximum length of a summary was 10 words. In some embodiments, the dataset may be split into training (17,569 screens), validation (2,298) and test set (2,434).

The Tappability Prediction dataset includes tappability annotations for more than 20 k UI elements from 3,218

Android screens. In the data collection, given a target UI element highlighted on a screen, a human rater was asked to answer yes or no for whether the target object looks clickable to them. In some embodiments, the dataset may be split into training (14,783), validation (1,854) and testing (2,029).

The Language Grounding dataset includes 10 k human annotations for operating UI objects of 1432 unique screens from 26 Android build-in apps like Settings. A human rater generated commands such as "Click the button below battery info", and the maximum length of a command phrase was 20 words. In some embodiments, the dataset may be split into training (7822), validation (1024) and testing (987).

When splitting each dataset into training, validation and test sets, it may be desirable to ensure that is no overlap of apps (or screens) between a training set and any of the test sets of different tasks. This can be significant because in the multi-task learning condition, VUT learns from all the training sets. Thus it is preferable that the union of apps and screens across all the training sets not overlap any of the test set.

In some embodiments, the training may be performed at the computing device.

In some embodiments, the predicting of the modeling task output involves obtaining a trained neural network at the computing device; and applying the trained neural network as obtained to the predicting of the modeling task output.

In some embodiments, the predicting of the modeling task output involves determining, by the computing device, a request to predict the modeling task output. The method also involves sending the request to predict the modeling task output from the computing device to a second computing device, the second computing device comprising a trained version of the neural network. After sending the request, the method involves the computing device receiving, from the second computing device, the predicted modeling task output.

Some example model parameters are provided for illustrative purposes, and are not be construed as limiting the scope of the claims. For the UI Object Detection task, VUT can be configured with a 12-layer Transformer encoder as the Image-Structure model that amounts to 48M trainable parameters, which is slightly less than 50M trainable parameters of DETR with a 6-layer encoder and a 6-layer decoder. For the remaining tasks, VUT can be configured with a 6-layer Transformer encoder for the Image-Structure model, and a 6-layer Transformer decoder for the Question-Answer model. When all the tasks are jointly trained, there are 64M parameters. Task-specific heads and word piece embeddings and projections are the main contributors to the growth of the parameter size. When only a subset of these tasks is involved in the training, e.g., Widget Captioning and Object Detection, there will likely be fewer trainable parameters involved because only part of the full model is in use. All the VUT variants use the following configurations: #Attention_Heads=8, Hidden_Dimension=256, Transformer_MLP_Dimension=2048, Transformer_QKV_Dimension=256.

All the tasks except UI Object Detection require the model to encode the view hierarchy. To do so, each object in the view hierarchy is represented as a content embedding $C_V$ and a positional encoding $P_V$. The content embedding embeds the object's attributes such as type, text content, and clickable attribute. For text content, it can treat all the word piece tokens possessed by the object as a "bag of words". Each token may be assigned a learnable embedding and then max pooling can be performed over the collection of embeddings to acquire a fixed-length embedding vector to represent the text content of the object. The embedding of each content attribute can be added to form the content embedding of the object.

Because a flattened view hierarchy is fed to the Transformer 118, it is desirable that the positional encoding be configured to capture both the spatial position and the structural position of an object. The spatial position includes the four coordinate values of the object's bounding box, i.e., [top, left, bottom, right], and the structural position includes the three DOM positional attributes, including the object's index position in the pre-order and the post-order traversal of the hierarchy, and the object's depth in the hierarchy. Each type of position may be encoded using a sinusoidal representation. Note that in Image-Structure model 108, positional encoding 116 is added to the input of each layer of the Transformer 118. This is in contrast to the Question-Answer model 126 where the positional encoding of each token is only added to the input of the first layer. The learned embedding for positional encoding is used in the Question-Answer model 126. During training, 10% dropout may be used for both the attention and the MLP dropout in the Questions-Answer Transformer 126, and a 20% dropout may be applied on the encodings from the Image-Structure model 108 before cross attention 146. During the 5-task joint learning, the attention and the MLP dropout rates can be 20% for the Image-Structure Transformer. During autoregressive decoding for interference, the maximum decoding length can be 30 that covers the total length of a question and an answer.

The tokenizing of phrases into a sequence of word pieces can be performed in a manner similar to that used in BERT, which results in a vocabulary size of 28,536. The maximum size for a screenshot image can be 1080×1080. Each image can be randomly resized for image augmentation. The maximum number of UI objects and containers on each screen may be capped to 128. The VUT may be implemented based in JAX2, a library for machine learning. In some embodiments, each VUT model may be trained with a batch size of 64 screens/examples, which the training is parallelized across 64 TPU v3 cores.

Example Applications

In some embodiments, user interface modeling is described. In one example implementation, a cloud-based developer tool may be provided. For example, a developer may be provided a platform for designing and/or improving a GUI. As described herein, neural network 100 may output a predicted task, and an interactive developer tool can be provided for a developer.

For example, tappability of on-screen objects may be identified, and a mismatch between a developer-designed tappability feature and a user-perceived tappability feature may be determined. The cloud-based developer tool may then provide such information to a developer to enable improvement of the tappability feature. Also, for example, in some embodiments, such a cloud-based developer tool may be a substantially real-time developer tool that models a GUI, predicts modeling task outputs, and provides recommendations, in substantial real-time.

In another example implementation, neural network 100 may predict a modeling task output that may be used to enhance user experience for an end-user of a mobile device. For example, grounding a language command into an executable UI action is described. This can enable enhanced user experience.

Also, for example, generating a language description for accessibility on mobile devices is described. As another example, summarization of a GUI may be performed and provided to a user. These features can also enable enhanced user experience, especially with text and/or voice commands to help a user navigate a GUI, and/or multiple screens of a GUI.

In some embodiments, understanding the usability of user interfaces is described, along with identifying the objects on the screen.

Additional and/or alternate applications are possible. For example, one or more features may be made available to a developer to assist in a task to develop a user platform via a GUI. For example, widget captioning can enable developers to use an output of a widget captioning task, instead of having to annotate the widgets manually.

Also, for example, an object detection task can provide a developer with a layout hierarchy of objects in a GUI, an index of the objects, their functionalities, and so forth. Such predicted outputs of neural network 100 can significantly reduce time and resources allocated to development tasks to be performed by a developer, and also enhances accuracy of the development tasks. This can be a significant application to development of mobile platforms, such as, for example, Android based systems.

The tasks may be performed by a single neural network model, which can be jointly trained to perform all the tasks, jointly trained to perform a particular subgroup of all the tasks, and/or trained independently to perform a task. Such choices may depend on the platform (e.g., mobile, or cloud-based), available resource allocations for processor, memory, power, network bandwidth, and so forth, and may depend on a target audience (e.g., end-user, developer, etc.).

One or more of such example features may be provided via a cloud-based platform, as an interactive feature, as a Platform-as-a-Service (PaaS) platform, a Software-as-a-Service (SaaS) platform, and/or a Machine-Learning-as-a-Service (MLaaS) platform. As described herein, the applications may enhance user experience for a user of a mobile phone, provide accessibility features for an end-user of a GUI, assist a developer in designing applications that are based on an operating system for a mobile platform such as a mobile device, assist a developer in troubleshooting various aspects of a GUI, and so forth.

Figure 2A:
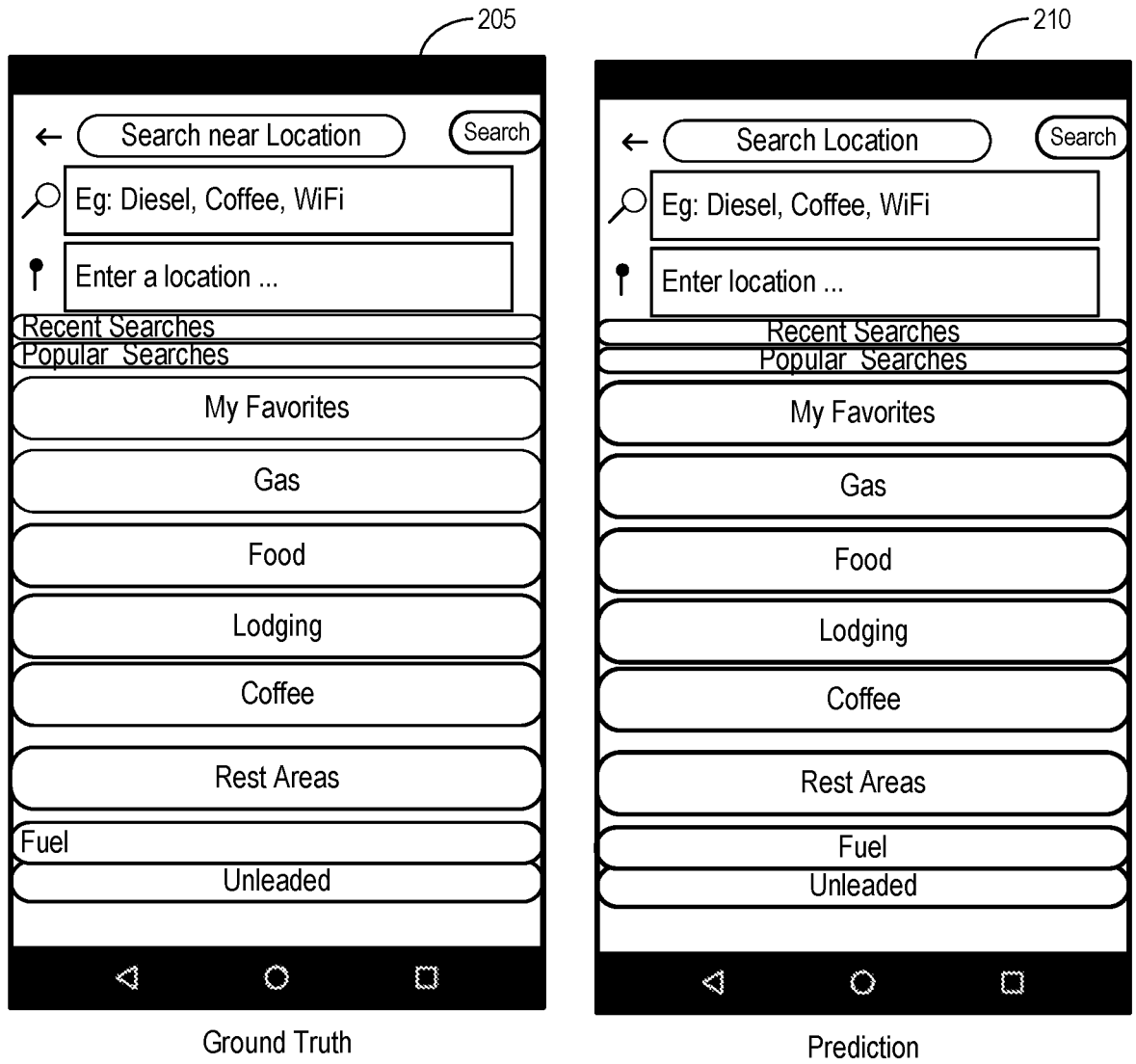
FIG. 2A illustrates example prediction results for a UI object detection task, in accordance with example embodiments.
Figure 2B:
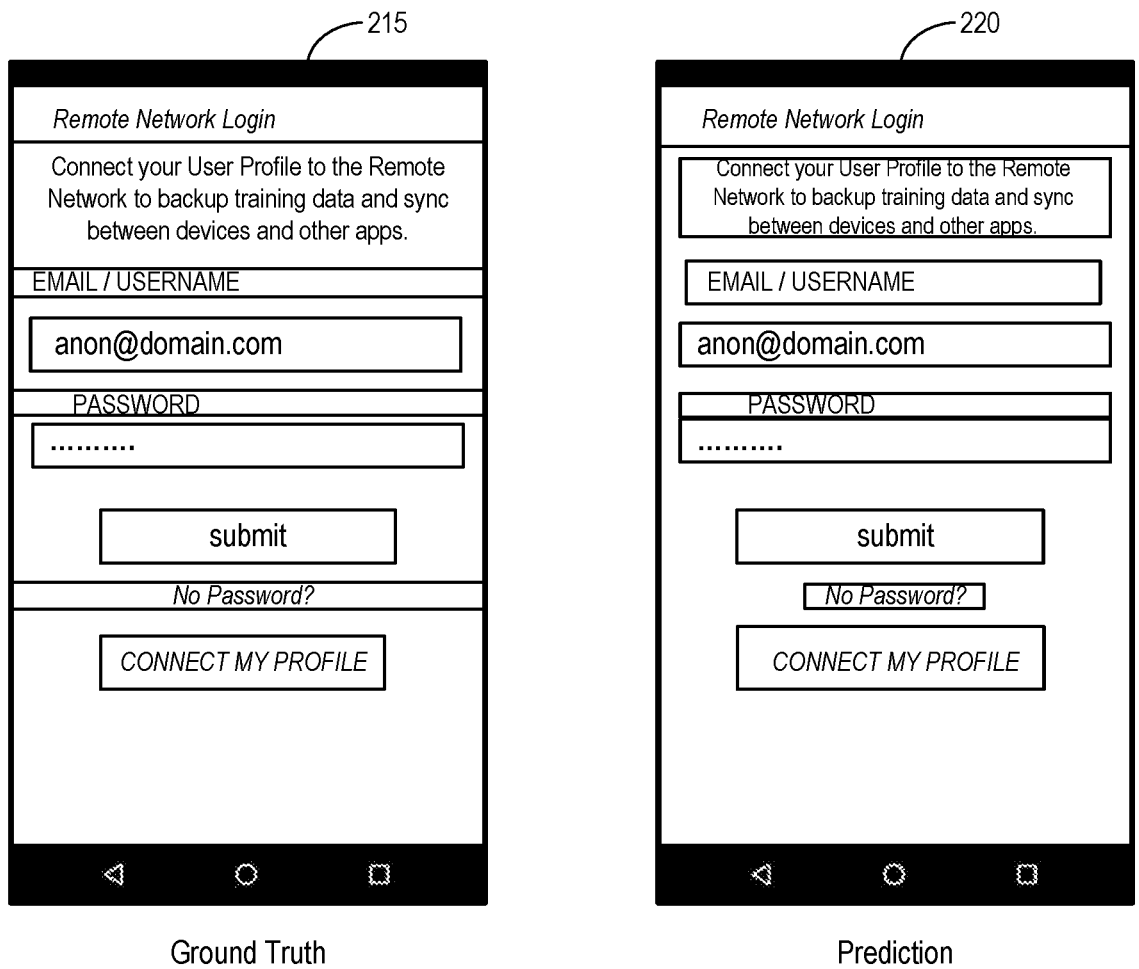
FIG. 2B illustrates additional example prediction results for a UI object detection task, in accordance with example embodiments.

FIGS. 2A and 2B illustrate example prediction results for a UI object detection task, in accordance with example embodiments. Examples are shown of predictions versus ground-truth for each task, on the test data, as achieved by a single model of VUT, when it learns all the tasks jointly. Referring to FIG. 2A, image 205 illustrates a ground truth image of a user interface for a search functionality, and image 210 illustrates the predicted image for the same user interface. Referring to FIG. 2B, image 215 illustrates a ground truth image of a user interface for a network login page functionality, and image 220 illustrates the predicted image for the same user interface.

Figure 3:
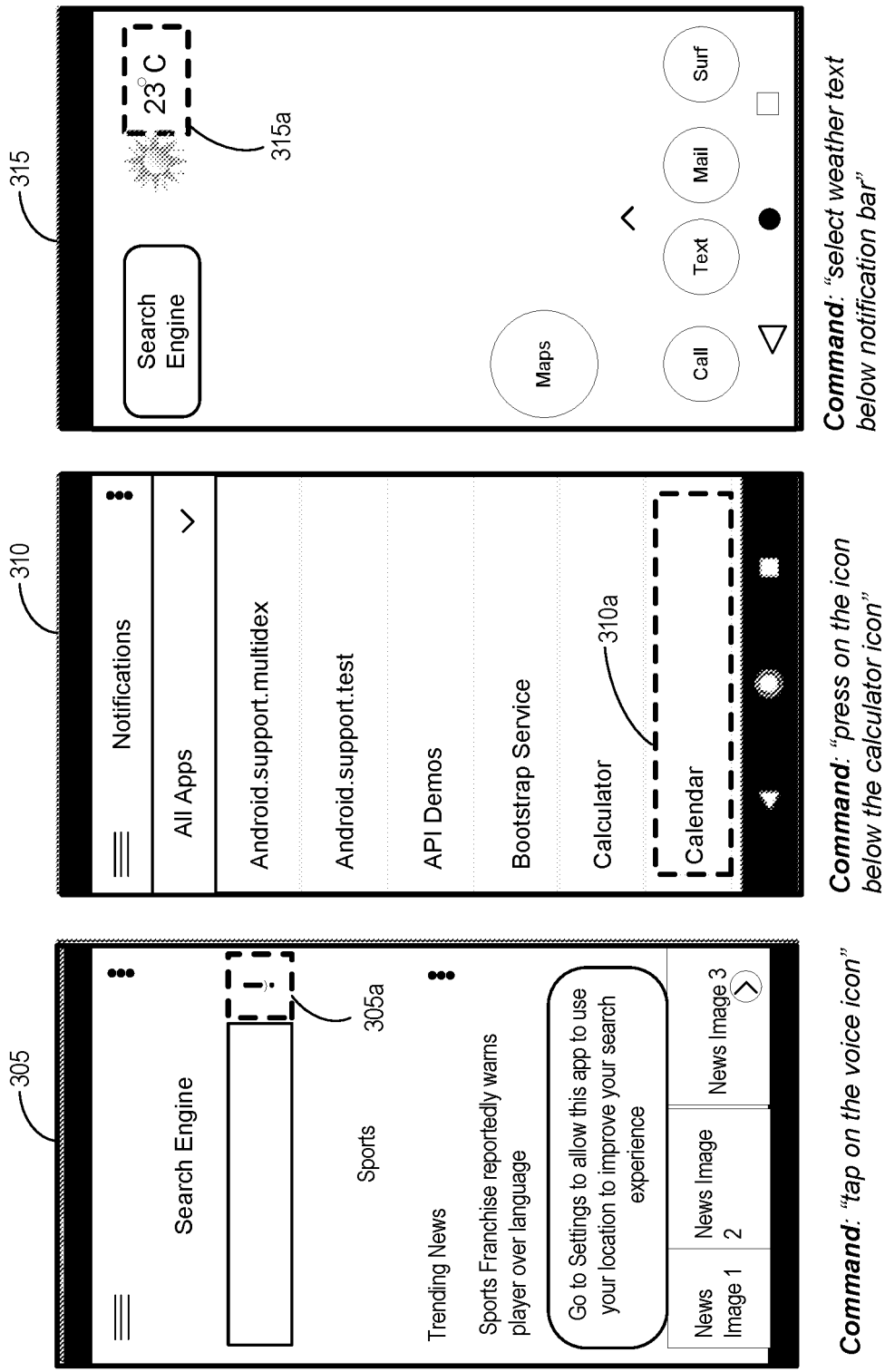
FIG. 3 illustrates examples for a language command detection task, in accordance with example embodiments.

FIG. 3 illustrates examples for a language command detection task, in accordance with example embodiments. The object located by the model is highlighted with a bounding box with a dashed boundary in each screenshot. For example, in image 305, a search page is displayed with a search box and a voice icon. A bounding box 305a around the voice icon is highlighted and the command detection task may predict the command "tap on the voice icon." As another example, in image 310, a page with a listing of apps is displayed. A bounding box 310a around the calendar icon (appearing below the calculator icon) is highlighted and the command detection task may predict the command "press on the icon below the calculator icon." Also, for example, in image 315, a home page is displayed with a weather notification. A bounding box 315a around the temperature display is highlighted and the command detection task may predict the command "select weather text below notification bar."

Figure 4:
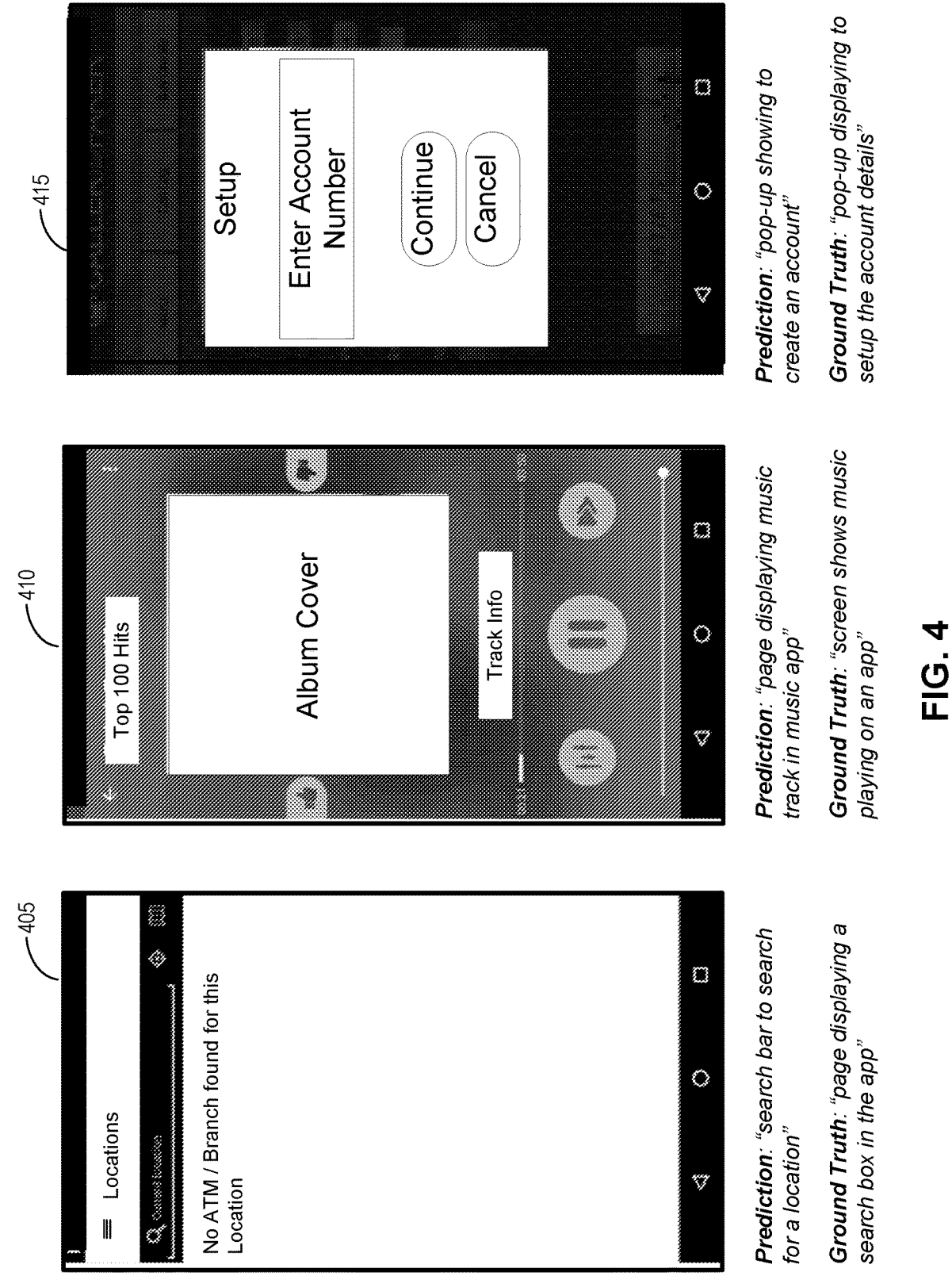
FIG. 4 illustrates examples for a screen summarization task, in accordance with example embodiments.

FIG. 4 illustrates examples for a screen summarization task, in accordance with example embodiments. References (ground-truth summaries) created by human annotators for each screen are displayed along with a prediction from the neural network. For example, in image 405, a location-based search page is displayed. A human annotator may have created a ground truth summary such as, "page displaying a search box in the app," and the screen summarization task may predict that the screen provides "a search bar to search for a location." As another example, in image 410, a page from a media playback app is displayed. A human annotator may have created a ground truth summary such as, "page shows music playing on an app," and the screen summarization task may predict that the screen provides "page displaying music track in music app." Also, for example, in image 415, a page for an account setup is displayed. A human annotator may have created a ground truth summary such as, "pop-up displaying to setup the account details," and the screen summarization task may predict that the screen provides "pop-up showing to create an account."

Figure 5:
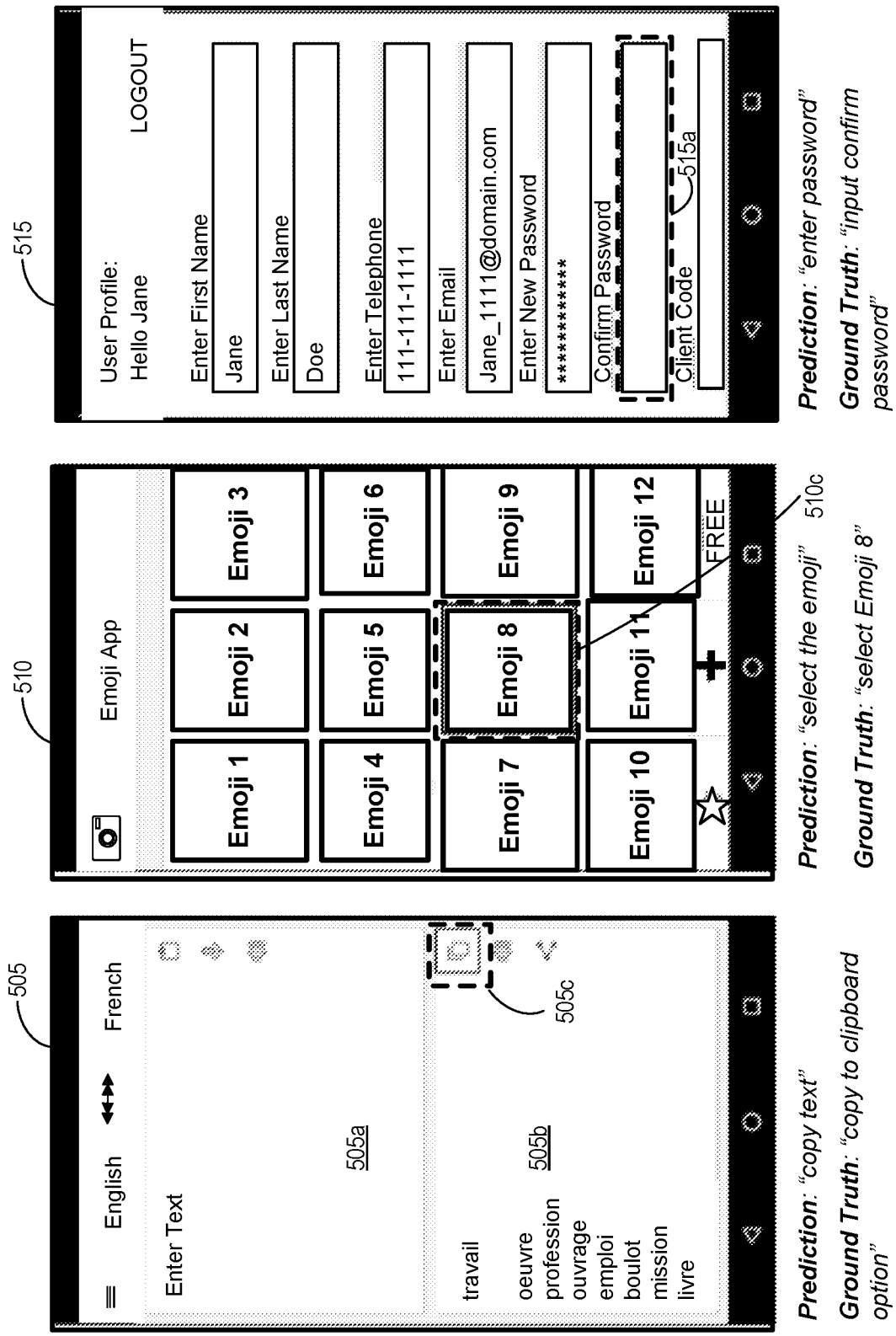
FIG. 5 illustrates examples for a widget captioning task, in accordance with example embodiments.

FIG. 5 illustrates examples for a widget captioning task, in accordance with example embodiments. The target element is highlighted via a bounding box with a dashed boundary. One of the three references (ground-truth captions) created by human annotators for each target element is shown. For example, in image 505, a page for translating words and/or phrases from one language to another is displayed, with a text entry portion 505a, a list of words in French in portion 505b, and a "copy" widget with a bounding box 505c. A ground truth caption may read, "copy to clipboard option," and the widget captioning task may display bounding box 505c around the "copy" widget and predict the widget caption to be "copy text." As another example, in image 510, a page with an emoji app displaying a plurality of emojis is displayed. A ground truth caption may read, "select emoji 8," and the widget captioning task may display bounding box 510c around the "emoji 8" widget and predict the widget caption to be "select the emoji." Also, for example, in image 515, a page with a user profile is displayed. A ground truth caption may read, "input and confirm password," and the widget captioning task may display bounding box 515a around the "confirm password" entry field widget and predict the widget caption to be "enter password."

Figure 6:
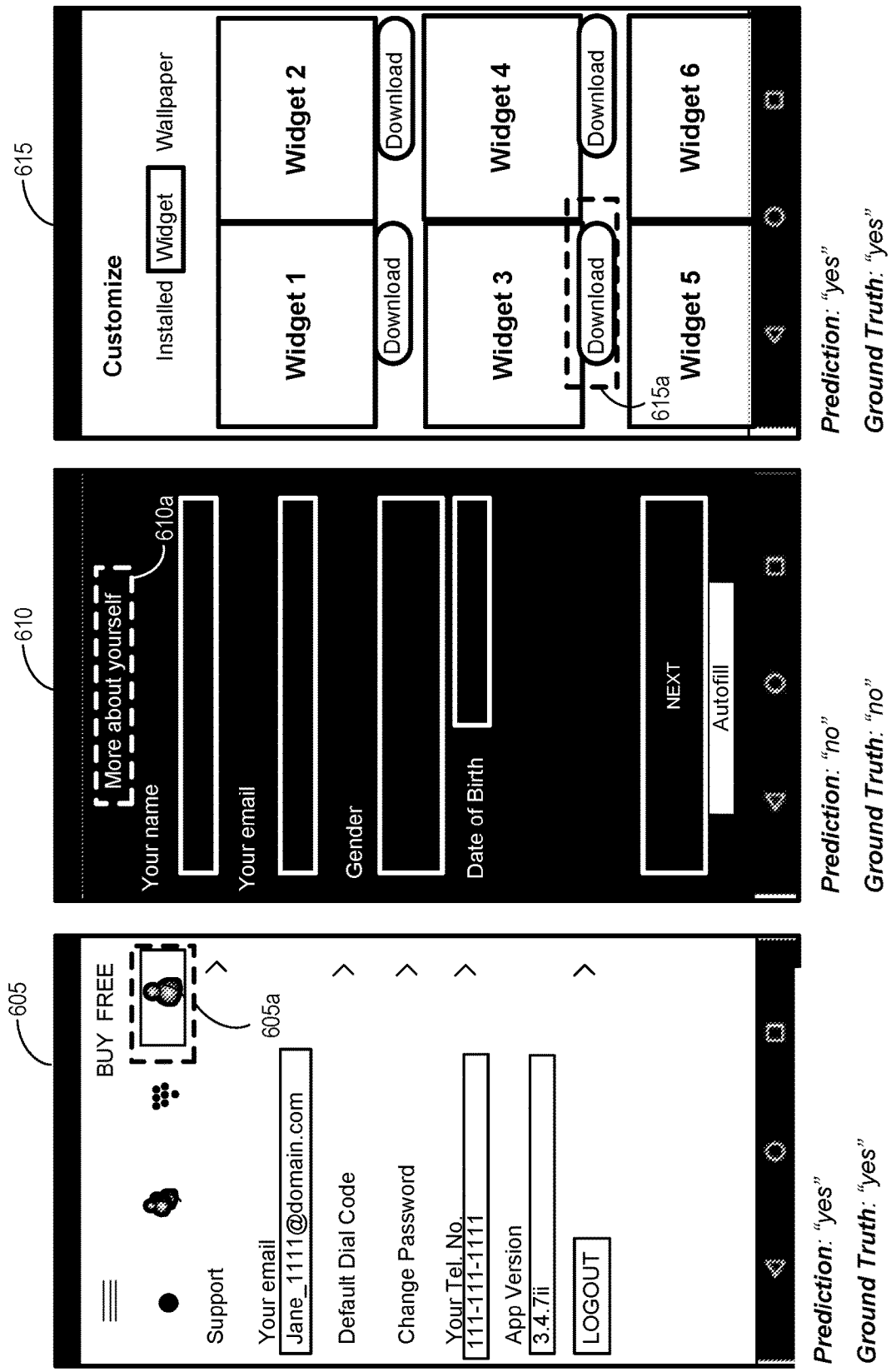
FIG. 6 illustrates examples for a tappability prediction task, in accordance with example embodiments.

FIG. 6 illustrates examples for a tappability prediction task, in accordance with example embodiments. The questioned element is highlighted with a bounding box with a dashed boundary. For example, in image 605, the tappability prediction task may be to predict a tappability of icon with a user image. The ground truth may indicate that the icon is tappable, and the model may predict that the icon is tappable and place a bounding box 605a around the icon. As another example, in image 610, the tappability prediction task may be to predict a tappability of icon with the text "more about yourself" The ground truth may indicate that the icon is not tappable, and the model may predict that the icon is not tappable and place a bounding box 610a around the icon. Also, for example, in image 615, the tappability prediction task may be to predict a tappability of a download icon for "Widget 3." The ground truth may indicate that the icon is tappable, and the model may predict that the icon is tappable and place a bounding box 615a around the download icon for "Widget 3."

These and other example applications are contemplated within a scope of this disclosure.

Experimental Results

Comparison of VUT and DETR

The image-structure model 108 described herein shares some aspects with the existing Transformer-based model for end-to-end object detection architecture (DETR). Accordingly, the two models may be compared for the UI Object Detection task. In this experiment, DETR can be configured to use a 6-layer Transformer encoder and a 6-layer Transformer decoder, and to have a similar number of parameters in the model, VUT Image-Structure can be configured to use a 12-layer Transformer encoder in this experiment. DETR (50M parameters) has slightly more parameters than VUT (48M parameters) due to the weights associated with encoder-decoder attention 146. Experiments indicate that the Image-Structure model clearly outperforms the DETR's encoder-decoder architecture. In fact, DETR experiments have found that more encoding layers significantly improves accuracy. But in the present experiment, VUT's Image-Structure model uses an encoder-only architecture and also achieves better accuracy. The experiment indicates that the present approach of multi-modal encoding performs well for the object detection task.

Single Task Training with VUT

To understand how well VUT performs when it learns multiple tasks jointly, a baseline can be established by training VUT based on each dataset alone. Each model may be trained until it converges. For the UI Object Detection task, the model may be trained with the default setup of DETR, using a batch size of 64 for 300 k iterations. The learning rate schedule includes one learning rate decay from $1e^{-4}$ to $1e^{-5}$ at the 200 k steps. In this experiment, a 6-layer Image-Structure encoder is used in VUT with a 8-head attention and 256 hidden size. The present model achieves AP=37.0, AP50=47.6 and AP75=38.8. Note that such accuracy is lower than previously reported results of using CenterNet on a different UI dataset. However, these results cannot be compared directly. The task for the VUT model is more challenging in that the VUT model is trained to detect 21 different UI object types including several container elements, instead of 12 objects in previous work. In addition, previous work used a dataset that is manually labeled by human and also employed heavy post-process to improve the predictions.

For the Widget Captioning task, both the 6-layer Image-Structure model and the 6-layer Question-Answer model may be used in addition to the Text head. Similarly, the model may be trained with a batch size of 64 until it converges, which may take 45 k steps. The VUT model achieves accuracy on par with existing models, although the model architecture of VUT is significantly different from the previous work. Table 1 below provides results for the Widget Captioning task:

TABLE 1

| Configurations | BLEU-1 | BLEU-2 | BLEU-3 | BLEU-4 | ROUGE | CIDEr |
|---|---|---|---|---|---|---|
| Widget Captioning alone | 45.8 | 30.2 | 19.6 | 12.9 | 46.0 | 94.8 |
| Widget Caption + Object Detection | 46.7 | 31.6 | 21.9 | 15.0 | 45.9 | 98.3 |
| 4 tasks (without Detection) | 43.3 | 28.5 | 18.7 | 14.0 | 44.0 | 88.9 |
| All 5 tasks | 47.0 | 32.3 | 22.7 | 16.3 | 46.8 | 99.3 |

For the Screen Summarization task, the same setup as training the model for Widget Captioning may be used, and the model converges at 50 k steps. See Table 2 for the accuracy VUT achieves:

TABLE 2

| Configurations | BLEU-1 | BLEU-2 | BLEU-3 | BLEU-4 | ROUGE | CIDEr |
|---|---|---|---|---|---|---|
| Screen Summarization alone | 68.7 | 49.4 | 31.6 | 19.4 | 53.8 | 64.3 |
| Summarization + Object Detection | 68.9 | 50.8 | 33.6 | 21.4 | 54.9 | 65.6 |
| 4 tasks (without Object Detection) | 68.2 | 49.4 | 32.2 | 20.2 | 53.5 | 56.8 |
| All 5 tasks | 67.7 | 49.2 | 32.1 | 20.1 | 53.9 | 65.1 |

The Language Command Grounding task uses a similar model setup as the Widget Captioning and the Screen Summarization tasks, except that it uses the Grounding Head instead of the Text Head. It may take the model approximately 27 k steps to converge with a batch size of 64 (see the results in Table 3 below). For training the model for each of these tasks, the learning rate may be decayed once from $1e^{-4}$ to $1e^5$ at 15 k steps.

TABLE 3

| Configurations | Ground accuracy (%) |
|---|---|
| Command Grounding one | 75.5 |
| Command Grounding + Object Detection | 52.1 |
| 4 tasks (without Object Detection) | 70.0 |
| All 5 tasks | 78.9 |

For learning the Tappability Prediction task alone, we used the same model setup as the two text related tasks (Summarization and Captioning). We found the model is very prone to overfitting in spite of using a large dropout rate. So we train the model with a batch size 64 with early stopping. The accuracy (Table 4 below) is comparable with the previously published results, although we here used a very different model architecture.

TABLE 4

| Configurations | Precision (%) | Recall (%) | F1 (%) |
|---|---|---|---|
| Tappability alone | 76.2 | 91.9 | 83.3 |
| Tappability + Object Detection | 76.9 | 91.5 | 83.5 |
| 4 tasks (without Object Detection) | 85.7 | 51.3 | 64.2 |
| All 5 tasks | 76.4 | 95.3 | 84.8 |

Training VUT for Multi-Tasks Jointly

The performance of VUT on multiple tasks simultaneously may be evaluated. In this experiment, both the 6-layer Image-Structure Transformer and the 6-layer Question-Answer Transformer may be used along with all the task heads.

Each task head and model parts may be used only when it is needed by a specific task. The entire model can be implemented based on Jax.

Because the UI Object Detection task requires many more iterations than other tasks, the multi-task learning may be initiated by training VUT for the UI Object Detection task, and then training VUT jointly for all the tasks by alternating batches from each dataset. This learning strategy is reasonable because by learning from the UI Object task, the model can learn useful information about how to encode the screen pixels. As it is consistently shown in experiments, joint learning that involves Object Detection can often boost the learning of the other four tasks.

Based on such a multi-task learning strategy, the VUT model may be first trained for UI Object Detection for approximately 300 k steps. The model may then be trained for approximately an additional 200 k steps for learning all the tasks together. At training, the model may be alternated among the 5 datasets and tasks, and a batch from one dataset may be used at a time. As illustrated in Tables 1, 2, 3, and 4 above, multi-task learning, though more challenging than single-task learning, can often perform on par with single-task learning. Multi-task learning appears to consistently outperform single-task learning for the Widget Captioning, the Screen Summarization and the Tappability Prediction tasks. There may be a decrease of accuracy for the Grounding task when text-generation related tasks are involved. This is consistent with the model architecture as the grounding task relies on the last hidden state of the Question-Answer model, and is likely to compete with the three text-generation tasks by "pulling" the hidden representations of the Question-Answer model towards different directions. However, it appears that having the Object Detection task in multi-task learning often outperforms the configuration without involving Object Detection. For the Object Detection task itself, there is may be a drop of accuracy when batch-alteration for multi-task learning starts. However, this gradually recovers its accuracy especially after the learning rate decay. The accuracy of Object Detection is recovered to AP=32.5, AP50=44.2 and AP75=33.7. The accuracy is likely to be further improved with careful learning rate scheduling and tuning.

Additional Experimental Results

As previously indicated, the VUT model may be first trained for the UI Object Detection task, which helps the model to acquire an understanding of screenshot images and learn to represent pixels before it is further trained together with other tasks. The accuracy of the model on the UI Object Detection task can be impacted as more tasks participate in the training.

TABLE 5

| Multi-Task Configurations | AP | $AP_{50}$ | $AP_{75}$ |
|---|---|---|---|
| Object Detection alone | 37.0 | 47.6 | 38.8 |
| Widget Captioning + Object Detection | 36.6 | 47.8 | 35.5 |
| Screen Summarization + Object Detection | 36.0 | 47.6 | 38.1 |
| Command Grounding + Object Detection | 37.0 | 47.8 | 39.0 |
| Tappability Prediction + Object Detection | 35.8 | 46.2 | 37.4 |
| All 5 tasks | 32.5 | 44.2 | 33.7 |
| All 5 tasks* | 34.6 | 46.3 | 36.0 |

As indicated in Table 5, the accuracy of VUT on the Object Detection task is mostly maintained when it is joined by an additional task for multi-task learning. When all the tasks join the training, i.e., the last row in the table, there is a more noticeable drop in the Object Detection accuracy. Fine-tuning learning rate schedules and dropout rates for different parts of the model can potentially bring the accuracy to its original level. For example, in All 5 tasks*, smaller dropouts in the Image-Structure Transformer are used, with no attention dropout and a 10% MLP dropout rate, as it appears that a larger dropout hurts the UI Object Detection task. Meanwhile, in this experiment, the MLP and attention dropout rates may be increased to 20% in the Question-Answer Transformer to avoid overfitting for other tasks. In this setup, the accuracy of the UI Object Detection is much better recovered, and there appear to be marginal impacts on the model accuracy for other tasks. These experiments show that instead of treating Object Detection as a standalone pretraining task, it is feasible for it to be part of the multi-task learning where VUT achieves all the tasks through a single model.

Training Machine Learning Models for Generating Inferences/Predictions

Figure 7:
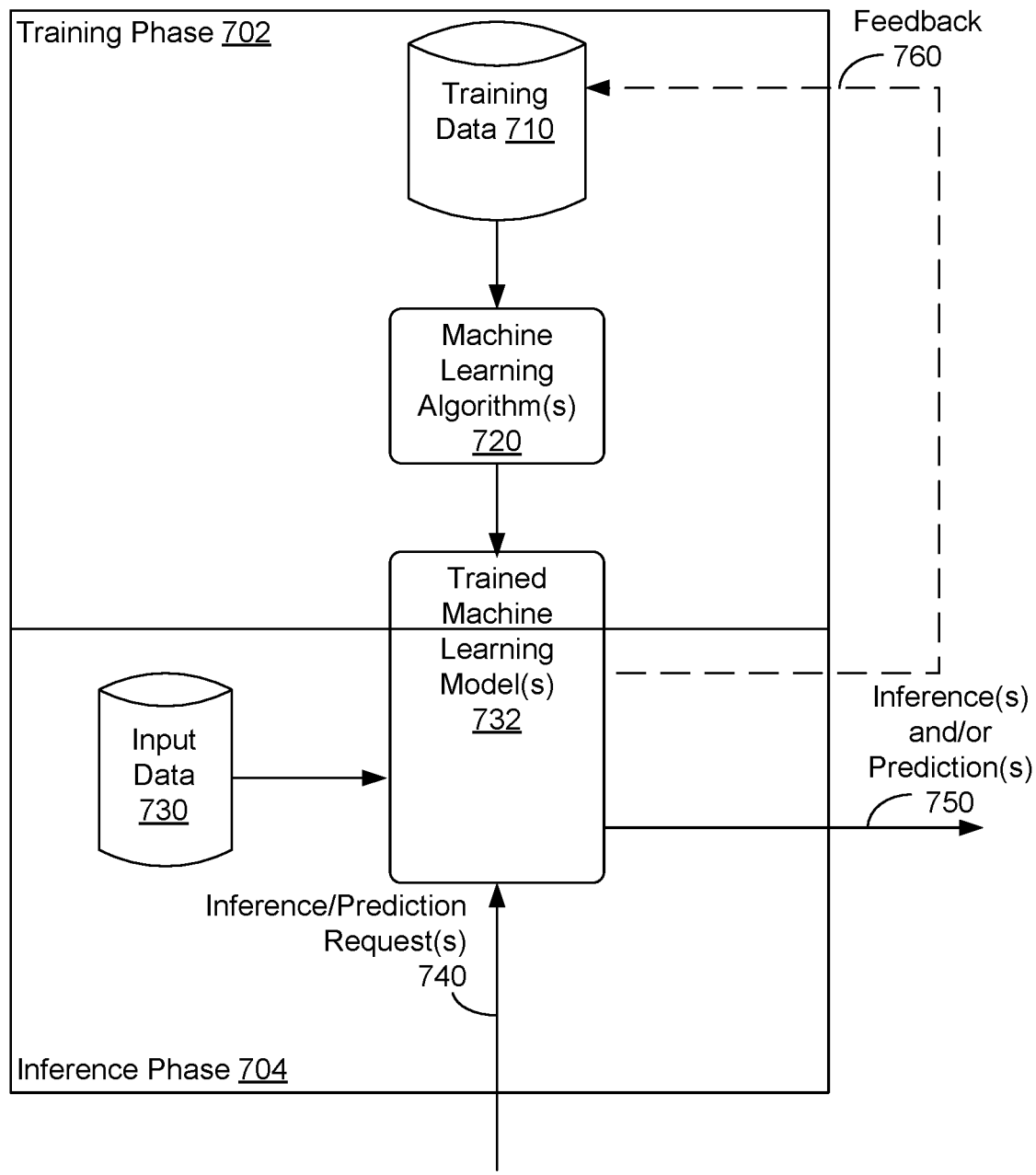
FIG. 7 is a diagram illustrating training and inference phases of a machine learning model, in accordance with example embodiments.

FIG. 7 shows diagram 700 illustrating a training phase 702 and an inference phase 704 of trained machine learning model(s) 732, in accordance with example embodiments. Some machine learning techniques involve training one or more machine learning algorithms, on an input set of training data to recognize patterns in the training data and provide output inferences and/or predictions about (patterns in the) training data. The resulting trained machine learning algorithm can be termed as a trained machine learning model. For example, FIG. 7 shows training phase 702 where one or more machine learning algorithms 720 are being trained on training data 710 to become trained machine learning model(s) 732. Then, during inference phase 704, trained machine learning model(s) 732 can receive input data 730 and one or more inference/prediction requests 740 (perhaps as part of input data 730) and responsively provide as an output one or more inferences and/or prediction(s) 750.

As such, trained machine learning model(s) 732 can include one or more models of one or more machine learning algorithms 720. Machine learning algorithm(s) 720 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 720 may be supervised or unsupervised, and may implement any suitable combination of online and offline learning.

In some examples, machine learning algorithm(s) 720 and/or trained machine learning model(s) 732 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 720 and/or trained machine learning model(s) 732. In some examples, trained machine learning model(s) 732 can be trained, reside and execute to provide inferences on a particular computing device, and/or otherwise can make inferences for the particular computing device.

During training phase 702, machine learning algorithm(s) 720 can be trained by providing at least training data 710 as training input using unsupervised, supervised, semi-supervised, and/or reinforcement learning techniques. Unsupervised learning involves providing a portion (or all) of training data 710 to machine learning algorithm(s) 720 and machine learning algorithm(s) 720 determining one or more output inferences based on the provided portion (or all) of training data 710. Supervised learning involves providing a portion of training data 710 to machine learning algorithm(s) 720, with machine learning algorithm(s) 720 determining one or more output inferences based on the provided portion of training data 710, and the output inference(s) are either accepted or corrected based on correct results associated with training data 710. In some examples, supervised learning of machine learning algorithm(s) 720 can be governed by a set of rules and/or a set of labels for the training input, and the set of rules and/or set of labels may be used to correct inferences of machine learning algorithm(s) 720.

Semi-supervised learning involves having correct results for part, but not all, of training data 710. During semi-supervised learning, supervised learning is used for a portion of training data 710 having correct results, and unsupervised learning is used for a portion of training data 710 not having correct results. Reinforcement learning involves machine learning algorithm(s) 720 receiving a reward signal regarding a prior inference, where the reward signal can be a numerical value. During reinforcement learning, machine learning algorithm(s) 720 can output an inference and receive a reward signal in response, where machine learning algorithm(s) 720 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 720 and/or trained machine learning model(s) 732 can be trained using other machine learning techniques, including but not limited to, incremental learning and curriculum learning.

In some examples, machine learning algorithm(s) 720 and/or trained machine learning model(s) 732 can use transfer learning techniques. For example, transfer learning techniques can involve trained machine learning model(s) 732 being pre-trained on one set of data and additionally trained using training data 710. More particularly, machine learning algorithm(s) 720 can be pre-trained on data from one or more computing devices and a resulting trained machine learning model provided to computing device CD1, where CD1 is intended to execute the trained machine learning model during inference phase 704. Then, during training phase 702, the pre-trained machine learning model can be additionally trained using training data 710, where training data 710 can be derived from kernel and non-kernel data of computing device CD1. This further training of the machine learning algorithm(s) 720 and/or the pre-trained machine learning model using training data 710 of CD1's data can be performed using either supervised or unsupervised learning. Once machine learning algorithm(s) 720 and/or the pre-trained machine learning model has been trained on at least training data 710, training phase 702 can be completed. The trained resulting machine learning model can be utilized as at least one of trained machine learning model(s) 732.

In particular, once training phase 702 has been completed, trained machine learning model(s) 732 can be provided to a computing device, if not already on the computing device. Inference phase 704 can begin after trained machine learning model(s) 732 are provided to computing device CD1.

During inference phase 704, trained machine learning model(s) 732 can receive input data 730 and generate and output one or more corresponding inferences and/or prediction(s) 750 about input data 730. As such, input data 730 can be used as an input to trained machine learning model(s) 732 for providing corresponding inference(s) and/or prediction(s) 750 to kernel components and non-kernel components. For example, trained machine learning model(s) 732 can generate inference(s) and/or prediction(s) 750 in response to one or more inference/prediction requests 740. In some examples, trained machine learning model(s) 732 can be executed by a portion of other software. For example, trained machine learning model(s) 732 can be executed by an inference or prediction daemon to be readily available to provide inferences and/or predictions upon request. Input data 730 can include data from computing device CD1 executing trained machine learning model(s) 732 and/or input data from one or more computing devices other than CD1.

Input data 730 can include training data described herein. Other types of input data are possible as well.

Inference(s) and/or prediction(s) 750 can include task outputs, numerical values, and/or other output data produced by trained machine learning model(s) 732 operating on input data 730 (and training data 710). In some examples, trained machine learning model(s) 732 can use output inference(s) and/or prediction(s) 750 as input feedback 760. Trained machine learning model(s) 732 can also rely on past inferences as inputs for generating new inferences.

After training, the trained version of the neural network can be an example of trained machine learning model(s) 732. In this approach, an example of the one or more inference/prediction request(s) 740 can be a request to predict a modeling task output for input screenshot and a corresponding example of inferences and/or prediction(s) 750 can be a predicted task output.

In some examples, one computing device CD_SOLO can include the trained version of the neural network, perhaps after training. Then, computing device CD_SOLO can receive a request to predict a modeling task output, and use the trained version of the neural network to predict the modeling task output.

In some examples, two or more computing devices CD_CLI and CD_SRV can be used to provide output images; e.g., a first computing device CD_CLI can generate and send requests to predict a modeling task output to a second computing device CD_SRV. Then, CD_SRV can use the trained version of the neural network, to predict the modeling task output, and respond to the requests from CD_CLI for the output class. Then, upon reception of responses to the requests, CD_CLI can provide the requested output (e.g., using a user interface and/or a display, a printed copy, an electronic communication, etc.).

Example Data Network

Figure 8:
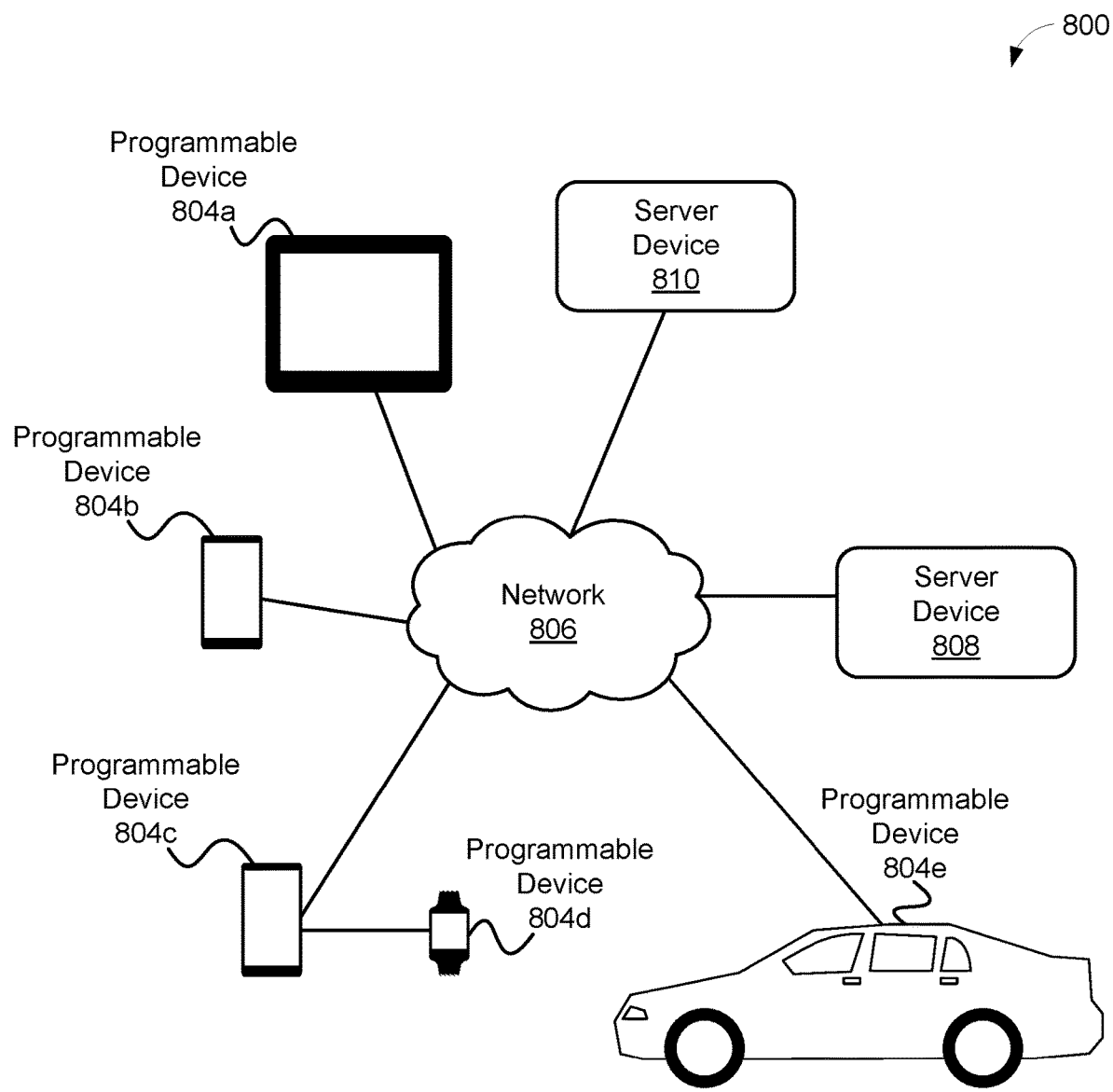
FIG. 8 depicts a distributed computing architecture, in accordance with example embodiments.

FIG. 8 depicts a distributed computing architecture 800, in accordance with example embodiments. Distributed computing architecture 800 includes server devices 808, 810 that are configured to communicate, via network 806, with programmable devices 804*a*, 804*b*, 804*c*, 804*d*, 804*e*. Network 806 may correspond to a local area network (LAN), a wide area network (WAN), a WLAN, a WWAN, a corporate intranet, the public Internet, or any other type of network configured to provide a communications path between networked computing devices. Network 806 may also correspond to a combination of one or more LANs, WANs, corporate intranets, and/or the public Internet.

Although FIG. 8 only shows five programmable devices, distributed application architectures may serve tens, hundreds, or thousands of programmable devices. Moreover, programmable devices 804*a*, 804*b*, 804*c*, 804*d*, 804*e* (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 804a, 804b, 804c, 804e, programmable devices can be directly connected to network 806. In other examples, such as illustrated by programmable device 804d, programmable devices can be indirectly connected to network 806 via an associated computing device, such as programmable device 804c. In this example, programmable device 804c can act as an associated computing device to pass electronic communications between programmable device 804d and network 806. In other examples, such as illustrated by programmable device 804e, a computing device can be part of and/or inside a vehicle, such as a car, a truck, a bus, a boat or ship, an airplane, etc. In other examples not shown in FIG. 8, a programmable device can be both directly and indirectly connected to network 806.

Server devices 808, 810 can be configured to perform one or more services, as requested by programmable devices 804a-804e. For example, server device 808 and/or 810 can provide content to programmable devices 804a-804e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 808 and/or 810 can provide programmable devices 804a-804e with access to software for database, search, computation, graphical, audio, video, World Wide Web/Internet utilization, and/or other functions. Many other examples of server devices are possible as well.

Computing Device Architecture

Figure 9:
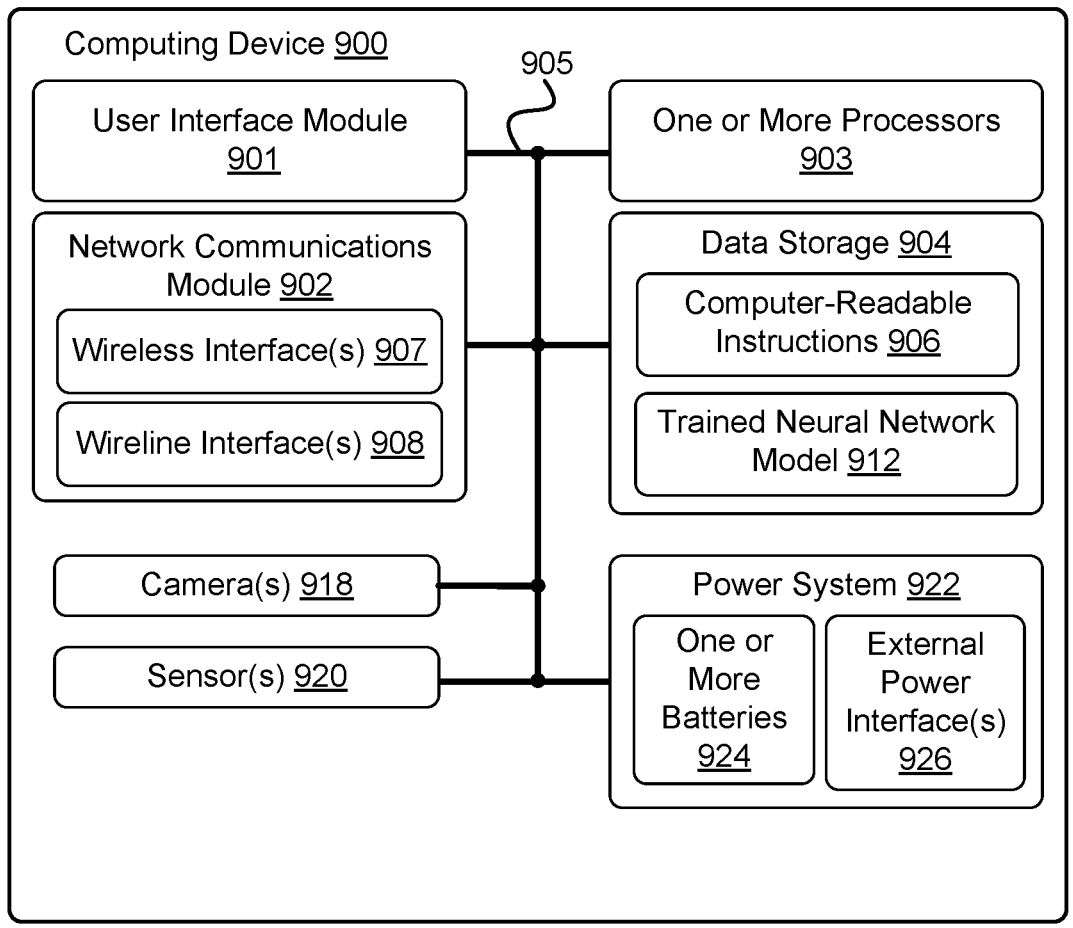
FIG. 9 is a block diagram of a computing device, in accordance with example embodiments.

FIG. 9 is a block diagram of an example computing device 900, in accordance with example embodiments. In particular, computing device 900 shown in FIG. 9 can be configured to perform at least one function of and/or related to neural network 100, and/or method 1100.

Computing device 900 may include a user interface module 901, a network communications module 902, one or more processors 903, data storage 904, one or more camera(s) 918, one or more sensors 920, and power system 922, all of which may be linked together via a system bus, network, or other connection mechanism 905.

User interface module 901 can be operable to send data to and/or receive data from external user input/output devices. For example, user interface module 901 can be configured to send and/or receive data to and/or from user input devices such as a touch screen, a computer mouse, a keyboard, a keypad, a touch pad, a trackball, a joystick, a voice recognition module, and/or other similar devices. User interface module 901 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 901 can also be configured to generate audible outputs, with devices such as a speaker, speaker jack, audio output port, audio output device, earphones, and/or other similar devices. User interface module 901 can further be configured with one or more haptic devices that can generate haptic outputs, such as vibrations and/or other outputs detectable by touch and/or physical contact with computing device 900. In some examples, user interface module 901 can be used to provide a graphical user interface (GUI) for utilizing computing device 900, such as, for example, a graphical user interface of a mobile phone device.

Network communications module 902 can include one or more devices that provide one or more wireless interface(s) 907 and/or one or more wireline interface(s) 908 that are configurable to communicate via a network. Wireless interface(s) 907 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 908 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 902 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 903 can include one or more general purpose processors, and/or one or more special purpose processors (e.g., digital signal processors, tensor processing units (TPUs), graphics processing units (GPUs), application specific integrated circuits, etc.). One or more processors 903 can be configured to execute computer-readable instructions 906 that are contained in data storage 904 and/or other instructions as described herein.

Data storage 904 can include one or more non-transitory computer-readable storage media that can be read and/or accessed by at least one of one or more processors 903. The one or more computer-readable storage media can include volatile and/or non-volatile storage components, such as optical, magnetic, organic or other memory or disc storage, which can be integrated in whole or in part with at least one of one or more processors 903. In some examples, data storage 904 can be implemented using a single physical device (e.g., one optical, magnetic, organic or other memory or disc storage unit), while in other examples, data storage 904 can be implemented using two or more physical devices.

Data storage 904 can include computer-readable instructions 906 and perhaps additional data. In some examples, data storage 904 can include storage required to perform at least part of the herein-described methods, scenarios, and techniques and/or at least part of the functionality of the herein-described devices and networks. In some examples, data storage 904 can include storage for a trained neural network model 912 (e.g., a model of trained neural networks such as neural network 100). In particular of these examples, computer-readable instructions 906 can include instructions that, when executed by one or more processors 903, enable computing device 900 to provide for some or all of the functionality of trained neural network model 912.

In some examples, computing device 900 can include one or more camera(s) 918. Camera(s) 918 can include one or more image capture devices, such as still and/or video cameras, equipped to capture light and record the captured light in one or more images; that is, camera(s) 918 can generate image(s) of captured light. The one or more images can be one or more still images and/or one or more images utilized in video imagery. Camera(s) 918 can capture light and/or electromagnetic radiation emitted as visible light, infrared radiation, ultraviolet light, and/or as one or more other frequencies of light.

In some examples, computing device 900 can include one or more sensors 920. Sensors 920 can be configured to measure conditions within computing device 900 and/or conditions in an environment of computing device 900 and provide data about these conditions. For example, sensors 920 can include one or more of: (i) sensors for obtaining data about computing device 900, such as, but not limited to, a thermometer for measuring a temperature of computing device 900, a battery sensor for measuring power of one or more batteries of power system 922, and/or other sensors measuring conditions of computing device 900; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 900, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 900, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 900, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 920 are possible as well.

Power system 922 can include one or more batteries 924 and/or one or more external power interfaces 926 for providing electrical power to computing device 900. Each battery of the one or more batteries 924 can, when electrically coupled to the computing device 900, act as a source of stored electrical power for computing device 900. One or more batteries 924 of power system 922 can be configured to be portable. Some or all of one or more batteries 924 can be readily removable from computing device 900. In other examples, some or all of one or more batteries 924 can be internal to computing device 900, and so may not be readily removable from computing device 900. Some or all of one or more batteries 924 can be rechargeable. For example, a rechargeable battery can be recharged via a wired connection between the battery and another power supply, such as by one or more power supplies that are external to computing device 900 and connected to computing device 900 via the one or more external power interfaces. In other examples, some or all of one or more batteries 924 can be non-rechargeable batteries.

One or more external power interfaces 926 of power system 922 can include one or more wired-power interfaces, such as a USB cable and/or a power cord, that enable wired electrical power connections to one or more power supplies that are external to computing device 900. One or more external power interfaces 926 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 926, computing device 900 can draw electrical power from the external power source the established electrical power connection. In some examples, power system 922 can include related sensors, such as battery sensors associated with the one or more batteries or other types of electrical power sensors.

Cloud-Based Servers

Figure 10:
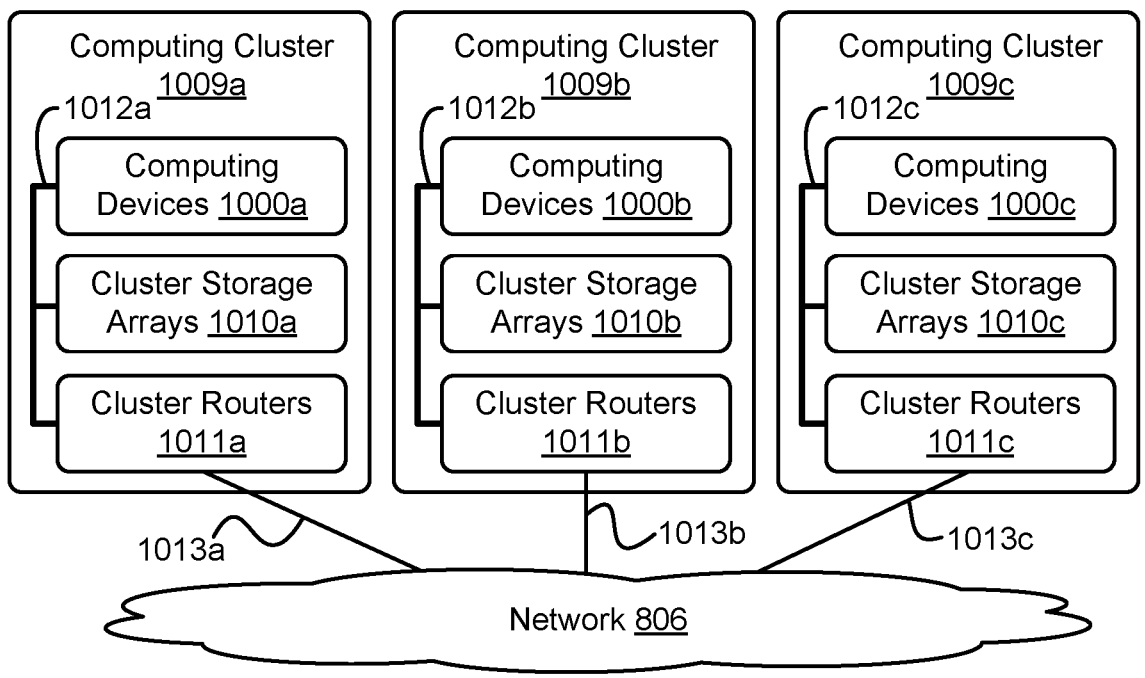
FIG. 10 depicts a network of computing clusters arranged as a cloud-based server system, in accordance with example embodiments.

FIG. 10 depicts a cloud-based server system in accordance with an example embodiment. In FIG. 10, functionality of a neural network, and/or a computing device can be distributed among computing clusters 1009a, 1009b, 1009c. Computing cluster 1009a can include one or more computing devices 1000a, cluster storage arrays 1010a, and cluster routers 1011a connected by a local cluster network 1012a. Similarly, computing cluster 1009b can include one or more computing devices 1000b, cluster storage arrays 1010b, and cluster routers 1011b connected by a local cluster network 1012b. Likewise, computing cluster 1009c can include one or more computing devices 1000c, cluster storage arrays 1010c, and cluster routers 1011c connected by a local cluster network 1012c.

In some embodiments, computing clusters 1009a, 1009b, 1009c can be a single computing device residing in a single computing center. In other embodiments, computing clusters 1009a, 1009b, 1009c can include multiple computing devices in a single computing center, or even multiple computing devices located in multiple computing centers located in diverse geographic locations. For example, FIG. 10 depicts each of computing clusters 1009a, 1009b, 1009c residing in different physical locations.

In some embodiments, data and services at computing clusters 1009a, 1009b, 1009c can be encoded as computer readable information stored in non-transitory, tangible computer readable media (or computer readable storage media) and accessible by other computing devices. In some embodiments, computing clusters 1009a, 1009b, 1009c can be stored on a single disk drive or other tangible storage media, or can be implemented on multiple disk drives or other tangible storage media located at one or more diverse geographic locations.

In some embodiments, each of computing clusters 1009a, 1009b, and 1009c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1009a, for example, computing devices 1000a can be configured to perform various computing tasks of a conditioned, axial self-attention based neural network, and/or a computing device. In one embodiment, the various functionalities of a neural network, and/or a computing device can be distributed among one or more of computing devices 1000a, 1000b, 1000c. Computing devices 1000b and 1000c in respective computing clusters 1009b and 1009c can be configured similarly to computing devices 1000a in computing cluster 1009a. On the other hand, in some embodiments, computing devices 1000a, 1000b, and 1000c can be configured to perform different functions.

In some embodiments, computing tasks and stored data associated with a neural network, and/or a computing device can be distributed across computing devices 1000a, 1000b, and 1000c based at least in part on the processing requirements of a neural network, and/or a computing device, the processing capabilities of computing devices 1000a, 1000b, 1000c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 1010a, 1010b, 1010c of computing clusters 1009a, 1009b, 1009c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a conditioned, axial self-attention based neural network, and/or a computing device can be distributed across computing devices 1000a, 1000b, 1000c of computing clusters 1009a, 1009b, 1009c, various active portions and/or backup portions of these components can be distributed across cluster storage arrays 1010a, 1010b, 1010c. For example, some cluster storage arrays can be configured to store one portion of the data of a first layer of a neural network, and/or a computing device, while other cluster storage arrays can store other portion(s) of data of second layer of a neural network, and/or a computing device. Also, for example, some cluster storage arrays can be configured to store the data of an encoder of a neural network, while other cluster storage arrays can store the data of a decoder of a neural network. Additionally, some cluster storage arrays can be configured to store backup versions of data stored in other cluster storage arrays.

Cluster routers 1011a, 1011b, 1011c in computing clusters 1009a, 1009b, 1009c can include networking equipment configured to provide internal and external communications for the computing clusters. For example, cluster routers 1011a in computing cluster 1009a can include one or more internet switching and routing devices configured to provide (i) local area network communications between computing devices 1000a and cluster storage arrays 1010a via local cluster network 1012a, and (ii) wide area network communications between computing cluster 1009a and computing clusters 1009b and 1009c via wide area network link 1013a to network 806. Cluster routers 1011b and 1011c can include network equipment similar to cluster routers 1011a, and cluster routers 1011b and 1011c can perform similar networking functions for computing clusters 1009b and 1009b that cluster routers 1011a perform for computing cluster 1009a.

In some embodiments, the configuration of cluster routers 1011a, 1011b, 1011c can be based at least in part on the data communication requirements of the computing devices and cluster storage arrays, the data communications capabilities of the network equipment in cluster routers 1011a, 1011b, 1011c, the latency and throughput of local cluster networks 1012a, 1012b, 1012c, the latency, throughput, and cost of wide area network links 1013a, 1013b, 1013c, and/or other factors that can contribute to the cost, speed, fault-tolerance, resiliency, efficiency and/or other design criteria of the moderation system architecture.

Example Methods of Operation

FIG. 11 is a flowchart of a method 1100, in accordance with example embodiments. Method 1100 can be executed by a computing device, such as computing device 900. Method 1100 can begin at block 1110, where the computing device receives a screenshot of a display provided by a graphical user interface of the computing device.

At block 1120, the computing device generates, by an image-structure transformer of a neural network, a representation by fusing a first embedding based on the screenshot and a second embedding based on a layout of virtual objects in the screenshot.

At block 1130, the computing device predicts, by the neural network and based on the generated representation, a modeling task output associated with the graphical user interface.

At block 1140, the computing device provides, by the computing device, the predicted modeling task output.

Some embodiments involve predicting, by the neural network, the layout of virtual objects in the screenshot.

Some embodiments involve receiving, via the computing device, a view hierarchy indicative of the layout of virtual objects in the screenshot. Such embodiments involve determining, by the neural network and for each of the screenshot and the view hierarchy, a content embedding and a positional embedding. The generating of the representation by fusing involves generating the representation based on the content embeddings and the positional embeddings. In such embodiments, the positional embedding for the screenshot and the positional embedding for the view hierarchy may be global embeddings corresponding to the entire screenshot.

In some embodiments, the modeling of the graphical user interface involves multi-task modeling, and wherein the neural network comprises dual transformers, wherein the image-structure transformer predicts the modeling task output for an image-structure task, a question-answer transformer predicts the modeling task output for a natural language task, and wherein the image-structure transformer and the question-answer transformer are configured with cross-tower attention.

In some embodiments, the modeling task output may be for one or more of: an object detection task, a natural language command grounding task, a widget captioning task, a screen summarizing task, or a tappability prediction task.

In some embodiments, the modeling task output may be for a natural language command grounding task. Such embodiments involve predicting, by the neural network and based on the representation, a target virtual object in the graphical user interface. Such embodiments also involve associating the target virtual object with a natural language command. Such embodiments further involve providing the natural language command via the graphical user interface.

In some embodiments, the providing of the natural language command involves displaying the natural language command at or near the target virtual object.

In some embodiments, the providing of the natural language command involves providing the natural language command as a voice command in response to user interaction with the target virtual object.

In some embodiments, the modeling task output may be for an object detection task. Such embodiments involve detecting, by the neural network, one or more types of container objects indicative of a layout hierarchy of the screenshot. In such embodiments, the layout hierarchy may include one of a linear layout, a frame layout, or a list.

In some embodiments, the modeling task output may be for an object detection task. Such embodiments involve detecting, by the neural network, one or more of a text field, a toggle button, or an image view.

In some embodiments, the modeling task output may be for a widget captioning task. Such embodiments involve predicting, by the neural network and for the screenshot, a natural language description of a functionality of a predicted virtual object in the graphical user interface.

In some embodiments, the modeling task output may be for a tappability prediction task. Such embodiments involve identifying, for the graphical user interface, a mismatch between a developer-designed tappability feature and a user-perceived tappability feature. Such embodiments also involve providing, to the developer of the graphical user interface, a recommendation to offset the identified mismatch.

In some embodiments, the neural network may include an object detection head, a text head, and a pointer head.

Some embodiments involve training the neural network to receive an input screenshot displayed by a particular graphical user interface, and predict a modeling task output associated with a modeling of the particular graphical user interface.

In some embodiments, the training is performed at the computing device.

In some embodiments, the predicting of the modeling task output involves obtaining a trained neural network at the computing device. Such embodiments also involve applying the trained neural network as obtained to the predicting of the modeling task output.

In some embodiments, the predicting of the modeling task output involves determining, by the computing device, a request to predict the modeling task output. Such embodiments involve sending the request to predict the modeling task output from the computing device to a second computing device, the second computing device comprising a trained version of the neural network. Such embodiments also involve, after sending the request, the computing device receiving, from the second computing device, the predicted modeling task output.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

As described herein, VUT, a multimodal Transformer for multi-task modeling of user interfaces is described. The model can be configured to take in three types of data, i.e., UI screenshot images, view hierarchy structures, and natural language questions. Experiments based on 5 datasets indicate that VUT achieves five types of UI tasks simultaneously, and demonstrates the promise of providing unified modeling for the user interface domain. The VUT model enables multi-modal multi-task learning for several benchmark UI tasks that can eventually benefit mobile interaction and user experiences.

Although the example tasks described herein address UI modeling problems, they may be generalized to different tasks. For example, the input and output modalities are based on generic data types. The input includes image, view hierarchy, and language. The output heads are equipped with the capability of generating view hierarchy, object references, and language responses. Accordingly, many tasks that are based on these input and output modalities can be potentially learned with this model. For example, the UI layout generation can be handled by the Question-Answer model to generate a sequence of tokens for linearized view hierarchies.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A computer-implemented method, comprising:
   receiving, via a computing device, a screenshot of a display of a graphical user interface comprising a plurality of user-interface elements;
   generating, by a neural network comprising an image-structure transformer comprising an image modality and a view hierarchy modality, a fused representation by fusing:
      a first embedding generated by an image embedder of the image modality, wherein the first embedding is of the screenshot, and
      a second embedding generated by a structure embedder of the view hierarchy modality, wherein the second embedding is of a view hierarchy structure representing a layout of the plurality of user-interface elements in the screenshot;
   generating, by the image-structure transformer, a hidden representation based on the fused representation, and
   wherein the neural network further comprises a question-answer transformer, and wherein the question-answer transformer is configured to utilize the hidden representation based on cross-tower attention;
   predicting, by the neural network and based on the generated fused representation, a modeling task output for a task of a plurality of tasks associated with the graphical user interface, wherein the neural network comprises a respective plurality of task heads corresponding to the plurality of tasks, and wherein different task heads of the plurality of task heads are configured to output different predicted modeling task outputs; and
   providing, by the computing device, the predicted modeling task output.

2. The computer-implemented method of claim 1, further comprising:
   predicting, by the neural network, the view hierarchy structure.

3. The computer-implemented method of claim 1, further comprising:
   receiving, via the computing device, the view hierarchy; and
   determining, by the neural network and for each of the screenshot and the view hierarchy, a content embedding and a positional embedding,
   wherein the generating of the fused representation comprises generating the fused representation based on the content embeddings and the positional embeddings.

4. The computer-implemented method of claim 3, wherein the positional embedding for the screenshot and the positional embedding for the view hierarchy are global embeddings corresponding to the entire screenshot.

5. The computer-implemented method of claim 1, wherein the modeling of the graphical user interface comprises multi-task modeling, wherein the image-structure transformer predicts the modeling task output for an image-structure task, and the question-answer transformer predicts the modeling task output for a natural language task.

6. The computer-implemented method of claim 1, wherein the modeling task output is for one or more of: an object detection task, a natural language command grounding task, a widget captioning task, a screen summarizing task, or a tappability prediction task.

7. The computer-implemented method of claim 1, wherein the modeling task output is for a natural language command grounding task, and the method further comprising:
   predicting, by the neural network and based on the representation, a target virtual object in the graphical user interface;
   associating the target virtual object with a natural language command; and
   providing the natural language command via the graphical user interface.

8. The computer-implemented method of claim 1, wherein the providing of the natural language command comprises displaying the natural language command at or near the target virtual object.

9. The computer-implemented method of claim 1, wherein the providing of the natural language command comprises providing the natural language command as a voice command in response to user interaction with the target virtual object.

10. The computer-implemented method of claim 1, wherein the modeling task output is for an object detection task, and the method further comprising:
    detecting, by the neural network, one or more types of container objects indicative of a layout hierarchy of the screenshot.

11. The computer-implemented method of claim 10, wherein the layout hierarchy comprises one of a linear layout, a frame layout, or a list.

12. The computer-implemented method of claim 1, wherein the modeling task output is for an object detection task, and the method further comprising:
    detecting, by the neural network, one or more of a text field, a toggle button, or an image view.

13. The computer-implemented method of claim 1, wherein the modeling task output is for a widget captioning task, and the method further comprising:
    predicting, by the neural network and for the screenshot, a natural language description of a functionality of a predicted virtual object in the graphical user interface.

14. The computer-implemented method of claim 1, wherein the modeling task output is for a tappability prediction task, and the method further comprising:
    identifying, for the graphical user interface, a mismatch between a developer-designed tappability feature and a user-perceived tappability feature; and providing, to the developer of the graphical user interface, a recommendation to offset the identified mismatch.

15. The computer-implemented method of claim 1, wherein the plurality of tasks comprises an object detection task, a text response task, or a command grounding task, and wherein the respective plurality of task heads comprises an object detection head, a text head, or a pointer head.

16. The computer-implemented method of claim 1, further comprising:
training the neural network to receive an input screenshot displayed by a particular graphical user interface, and predict a modeling task output associated with a modeling of the particular graphical user interface.

17. The computer-implemented method of claim 16, wherein the training is performed at the computing device.

18. The computer-implemented method of claim 1, wherein the predicting of the modeling task output further comprises:
obtaining a trained neural network at the computing device; and
applying the trained neural network as obtained to the predicting of the modeling task output.

19. The computer-implemented method of claim 1, wherein the predicting of the modeling task output comprises:
determining, by the computing device, a request to predict the modeling task output;
sending the request to predict the modeling task output from the computing device to a second computing device, the second computing device comprising a trained version of the neural network; and
after sending the request, the computing device receiving, from the second computing device, the predicted modeling task output.

20. A computing device, comprising:
one or more processors; and
data storage, wherein the data storage has stored thereon computer-executable instructions that, when executed by the one or more processors, cause the computing device to carry out functions comprising:
receiving, by the computing device, a screenshot of a display of a graphical user interface comprising a plurality of user-interface elements;
generating, by a neural network comprising an image-structure transformer comprising an image modality and a view hierarchy modality, a fused representation by fusing:
a first embedding generated by an image embedder of the image modality, wherein the first embedding is of the screenshot,
a second embedding generated by a structure embedder of the view hierarchy modality, wherein the second embedding is of a view hierarchy structure representing a layout of the plurality of user-interface elements in the screenshot,
generating, by the image-structure transformer, a hidden representation based on the fused representation, and
wherein the neural network further comprises a question-answer transformer, and wherein the question-answer transformer is configured to utilize the hidden representation based on cross-tower attention;
predicting, by the neural network and based on the generated fused representation, a modeling task output for a task of a plurality of tasks associated with the graphical user interface, wherein the neural network comprises a respective plurality of task heads corresponding to the plurality of tasks, and wherein different task heads of the plurality of task heads are configured to output different predicted modeling task outputs; and
providing the predicted modeling task output.

21. An article of manufacture comprising one or more non-transitory computer readable media having computer-readable instructions stored thereon that, when executed by one or more processors of a computing device, cause the computing device to carry out functions comprising:
receiving, by the computing device, a screenshot of a display of a graphical user interface comprising a plurality of user-interface elements;
generating, by a neural network comprising an image-structure transformer comprising an image modality and a view hierarchy modality, a fused representation by fusing:
a first embedding generated by an image embedder of the image modality, wherein the first embedding is of the screenshot, and
a second embedding generated by a structure embedder of the view hierarchy modality, wherein the second embedding is of a view hierarchy structure representing a layout of the plurality of user-interface elements in the screenshot;
generating, by the image-structure transformer, a hidden representation based on the fused representation, and
wherein the neural network further comprises a question-answer transformer, and wherein the question-answer transformer is configured to utilize the hidden representation based on cross-tower attention;
predicting, by the neural network and based on the generated fused representation, a modeling task output for a task of a plurality of tasks associated with the graphical user interface, wherein the neural network comprises a respective plurality of task heads corresponding to the plurality of tasks, and wherein different task heads of the plurality of task heads are configured to output different predicted modeling task outputs; and
providing the predicted modeling task output.

22. The computer-implemented method of claim 1, wherein the respective plurality of task heads are jointly trainable.

23. The computer-implemented method of claim 1, wherein one or more of the respective plurality of task heads are independently trainable.

24. The computer-implemented method of claim 1, wherein the plurality of user-interface elements comprise one or more of virtual objects, lists, images, videos, icons, user-selectable icons, user-adjustable controls, application interfaces, application icons, a text input field, an image input field, or an audio input field.

* * * * *